(12) United States Patent
Mesaros

(10) Patent No.: US 8,160,931 B2
(45) Date of Patent: *Apr. 17, 2012

(54) HOSTED DEMAND AGGREGATION

(75) Inventor: Gregory J. Mesaros, Tampa, FL (US)

(73) Assignee: eWinWin, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/272,147

(22) Filed: Oct. 12, 2011

(65) Prior Publication Data

US 2012/0036001 A1    Feb. 9, 2012

Related U.S. Application Data

(63) Continuation of application No. 11/618,412, filed on Dec. 29, 2006, which is a continuation-in-part of application No. 11/464,376, filed on Aug. 14, 2006, now Pat. No. 7,689,469, and a continuation-in-part of application No. 11/556,604, filed on Nov. 3, 2006, now Pat. No. 7,747,473, and a continuation-in-part of application No. 09/922,884, filed on Aug. 6, 2001.

(51) Int. Cl.
*G06Q 30/02* (2012.01)
*G06Q 30/06* (2012.01)

(52) U.S. Cl. .............. 705/26.2; 705/14.25; 705/14.34; 705/14.35

(58) Field of Classification Search ......... 705/26.1, 705/26.2, 26.4, 14.1, 14.25, 14.34, 14.35
See application file for complete search history.

(56) References Cited

U.S. PATENT DOCUMENTS

| | | | |
|---|---|---|---|
| 6,269,343 B1 * | 7/2001 | Pallakoff ................... 705/26.2 |
| 6,604,089 B1 * | 8/2003 | Van Horn et al. ............ 705/26.2 |
| 6,847,965 B2 * | 1/2005 | Walker et al. ................ 707/737 |
| 6,915,275 B2 * | 7/2005 | Banerjee et al. ............. 705/26.5 |
| 6,934,690 B1 * | 8/2005 | Van Horn et al. ............ 705/26.2 |
| 7,181,419 B1 * | 2/2007 | Mesaros ..................... 705/26.2 |
| 7,349,890 B1 * | 3/2008 | Pathak et al. ................... 706/47 |
| 7,496,543 B1 * | 2/2009 | Bamford et al. ............. 705/400 |
| 2001/0047296 A1 * | 11/2001 | Wyker ......................... 705/14 |
| 2001/0047311 A1 * | 11/2001 | Singh .............................. 705/26 |
| 2002/0026351 A1 * | 2/2002 | Coleman ....................... 705/14 |

(Continued)

FOREIGN PATENT DOCUMENTS

WO    WO-9821713 A2 *    5/1998

OTHER PUBLICATIONS

Lamparter, W.C., "Natural Selection," American Printer, vol. 217, No. 3, pp. 54-64, Jun. 1996.*

(Continued)

*Primary Examiner* — Nicholas D Rosen
(74) *Attorney, Agent, or Firm* — Lewis and Roca LLP

(57) ABSTRACT

The demand aggregation system includes deal room sponsored by a third party host. The third party host facilitates commercial transactions between a plurality of buyers and at least one seller. In exchange for sponsorship of such a deal room, the third party host can receive an incentive such as a percentage of sales, seller discount or the like. Furthermore, mechanisms are provided to aid discovery of sellers and/or offers that can be included in a group buying event for a buying group. The buying group receives a greater discount as the total purchase amount in the group buying event increases.

16 Claims, 23 Drawing Sheets

U.S. PATENT DOCUMENTS

| | | | |
|---|---|---|---|
| 2002/0046147 A1* | 4/2002 | Livesay et al. | 705/37 |
| 2002/0091580 A1* | 7/2002 | Wang | 705/26 |
| 2002/0107773 A1* | 8/2002 | Abdou | 705/37 |
| 2002/0116282 A1* | 8/2002 | Martin et al. | 705/26 |
| 2002/0165771 A1* | 11/2002 | Walker et al. | 705/14 |
| 2003/0167222 A1* | 9/2003 | Mehrotra et al. | 705/37 |
| 2005/0038713 A1* | 2/2005 | Pickard et al. | 705/26 |
| 2006/0069619 A1* | 3/2006 | Walker et al. | 705/14 |
| 2006/0095366 A1* | 5/2006 | Sheth et al. | 705/37 |
| 2006/0129454 A1* | 6/2006 | Moon et al. | 705/14 |
| 2009/0055328 A1* | 2/2009 | Bamford et al. | 705/400 |
| 2009/0327101 A1* | 12/2009 | Sayed | 705/27 |

OTHER PUBLICATIONS

Anon., "Open Market Introduces New Software for Dynamic Web-based Commerce," PR Newswire, Oct. 1, 1996.*

Merriam-Webster's Collegiate Dictionary, Tenth Edition, 1997, p. 732.*

Millman, H., "Legacy Data Links Shrink Costs," InfoWorld, vol. 20, No. 1, pp. 51, 56, Jan. 5, 1998.*

Anon., "ELCOM: Virgin Trains Cuts Procurement Costs with elcom.com; New Electronic Ordering System Offers Personalised Pricing," M2 Presswire, Jul. 18, 2000.*

Anon., "The Oil & Gas Asset Clearinghouse, a Petroleum Place Company, to Host Its Second Exclusively Online Auction of Oil & Gas Properties on Aug. 14-16, 2000," PR Newsire, p. 5591, Aug. 3, 2000.*

Anon., "Screen Savers," Lawyer, Feb. 19, 2001.*

Rozic, J., "Who's Watching While You Surf?" Inside Business, vol. 3, No. 5, p. 64, May 2001.*

* cited by examiner

1200

BUYER REGISTRATION

BUYER NAME:

ADDRESS:

TELEPHONE:

FAX:

E-MAIL:

PREFERRED CONTACT METHOD:

PREFERRED USER NAME:

PREFERRED PASSWORD:

PREFERRED PASSWORD (VERIFICATION):

Fig. 12

GROUP OFFER

Store/Location: Seller #1

Date: November 15th

Offer Period: 12:00pm – 4:00pm

Group/Offer Code:

Price Curve: Expressed in Dollars Purchased by Group $100 = 2% off purchase volume
$250 = 4%
$500 = 6%
$1,000 = 8%
2,000 = 10%
$5,000+ = 15%

OFFER INFORMATION

DESCRIPTION OF OFFER/PRODUCT(S):

DESIRED START DATE AND TIME:

DESIRED END DATE AND TIME:

DESIRED PRICE SCHEDULE:

| TOTAL PURCHASE AMOUNT | DISCOUNT |
|---|---|
| $100 | 2% |
| $250 | 4% |
| $500 | 6% |
| $1,000 | 8% |
| $2,000 | 10% |
| $5,000+ | 15% |

DESIRED MAVEN(S):

MAVEN PRICE INCENTIVE:

HOSTED DEMAND AGGREGATION

CROSS-REFERENCE TO RELATED APPLICATIONS

This application is a continuation of U.S. patent application Ser. No. 11/618,412, filed Dec. 29, 2006 and entitled HOSTED DEMAND AGGREGATION, which:

(1) is a continuation-in-part of U.S. Pat. No. 7,689,469, filed Aug. 14, 2006 and entitled E-COMMERCE VOLUME PRICING, which is a continuation of U.S. Pat. No. 7,124,099, filed on Feb. 20, 2003 and entitled E-COMMERCE VOLUME PRICING, which is a continuation of U.S. patent application Ser. No. 09/324,391, filed Jun. 3, 1999 and entitled E-COMMERCE VOLUME PRICING, now abandoned, which claims the benefit of U.S. Provisional Patent Application Ser. No. 60/133,769, filed May 12, 1999 and entitled E-COMMERCE VOLUME PRICING;

(2) is a continuation-in-part of U.S. Pat. No. 7,747,473, filed Nov. 3, 2006 and entitled DEMAND AGGREGATION SYSTEM, which is a continuation of U.S. Pat. No. 7,181,419, filed on Sep. 13, 2002 and entitled DEMAND AGGREGATION SYSTEM, which claims the benefit of U.S. Provisional Application Ser. No. 60/318,789 filed on Sep. 13, 2001;

(3) is a continuation-in-part of U.S. patent application Ser. No. 09/922,884, entitled E-COMMERCE VOLUME PRICING filed on Aug. 6, 2001, which:

(A) is a continuation-in-part of U.S. patent application Ser. No. 09/324,391, entitled E-COMMERCE VOLUME PRICING filed on Jun. 3, 1999, which claims priority to U.S. Patent Application Ser. No. 60/133,769, filed May 12, 1999, and entitled E-COMMERCE VOLUME PRICING;

(B) is a continuation-in-part of U.S. Pat. No. 7,818,212, filed Oct. 22, 1999 and entitled MULTIPLE CRITERIA BUYING AND SELLING MODEL;

(C) is a continuation-in-part of P.C.T. Patent Application Serial No. PCT/US00/11989, filed May 3, 2000, and entitled MULTIPLE CRITERIA BUYING AND SELLING MODEL, AND SYSTEM FOR MANAGING OPEN OFFER SHEETS, which claims priority to: U.S. Patent Application Ser. No. 60/137,583, filed Jun. 4, 1999, and entitled E-COMMERCE AUTOMATED SELLER SELECTION SYSTEM; U.S. Patent Application Ser. No. 60/138,209, filed Jun. 9, 1999, and entitled SECURITIZATION OF ACCOUNTS RECEIVABLE; U.S. Patent Application Ser. No. 60/139,338, filed Jun. 16, 1999, and entitled REAL-TIME OPTIMIZED BUYING BLOCK; U.S. Patent Application Ser. No. 60/139,518, filed Jun. 16, 1999, and entitled REAL-TIME MARKET PURCHASING; U.S. Patent Application Ser. No. 60/139,519, filed Jun. 16, 1999, and entitled E-COMMERCE PURCHASING CARD; U.S. patent application Ser. No. 09/342,345, filed Jun. 29, 1999, and entitled CREDIT BASED TRANSACTION SYSTEM AND METHODOLOGY; U.S. Patent Application Ser. No. 60/142,371, filed Jul. 6, 1999, and entitled TIME VALUE OF MONEY BASED CREDIT CARD FOR MERCHANT; U.S. Patent Application Ser. No. 60/160,510, filed Oct. 20, 1999, and entitled MULTIPLE CRITERIA BUYING AND SELLING MODEL, AND SYSTEM FOR MANAGING OPEN OFFER SHEETS; U.S. patent application Ser. No. 09/426,063, filed Oct. 22, 1999, and entitled MULTIPLE CRITERIA BUYING AND SELLING MODEL; U.S. Patent Application Ser. No. 60/162,182, filed Oct. 28, 1999, and entitled MULTIPLE CRITERIA BUYING AND SELLING MODEL, AND SYSTEM FOR MANAGING OPEN OFFER SHEETS; and U.S. Patent Application Ser. No. 60/173,409, filed Dec. 28, 1999, and entitled MULTIPLE CRITERIA BUYING AND SELLING MODEL, AND SYSTEM FOR MANAGING OPEN OFFER SHEETS; and (D) claims priority to U.S. Patent Application Ser. No. 60/237,474, filed Oct. 2, 2000, and entitled MULTIPLE CRITERIA BUYING AND SELLING MODEL, AND SYSTEM FOR MANAGING OPEN OFFER SHEETS.

The entireties of all prior-filed applications listed herein are hereby incorporated herein by reference.

BACKGROUND

The buying and selling of products and services (collectively referred to as "products") has resulted in a vast array of buying or costing schemes, which are used to select the price at which such products are sold.

One of the most common costing schemes which consumers encounter everyday is known as fixed pricing. According to this costing scheme, sellers set a fixed price for their products based on a past demand for the product and/or anticipated future demand. Buyers desiring to purchase products from the seller are each required to pay the same fixed price regardless of the number of products purchased. If a seller finds that the demand for a given product is greater or less than expected, the seller may later adjust the fixed price of the product to account for such findings. Although the fixed pricing provides a simple way for a seller to conduct business with multiple buyers, one drawback of this costing scheme is that it fails to reward buyers willing to purchase greater quantities of products. Accordingly, the discount quantity pricing scheme evolved.

The discount quantity pricing approach to costing involves pricing a product at different levels depending on the quantity of products a customer is willing to purchase. The more products a customer is willing to purchase, the lower the price. Sellers have incentive to lower price for large quantity buyers since the fixed costs associated with producing the product is spread over more items. Thus, sellers are able to make equal or greater profits despite the lowered price of the product. While volume pricing offers a benefit to larger buyers who are able to purchase large quantities of goods at one time, smaller buyers are often unable to obtain the lowered prices and therefore are more likely to "shop around" for the best available deal. This, in turn, hurts both the buyer and seller. For instance, the smaller buyer is burdened with needing to search for alternative deals and still often ends up paying a higher price than larger buyers. The sellers, on the other hand, are faced with lost business since they are unable to reduce their price for the smaller buyers and still make sufficient profit.

Another common costing scheme for pricing a product is an auction. In an auction, a seller sets an initial price for an item and then multiple buyers are given an opportunity to bid against each other for the product. The buyer having placed the highest bid for the product at the end of the auction purchases the product at the final price bid. In order to provide a larger forum for buyers and sellers, a recent trend has been to auction goods electronically over the Internet. For example, one company known to operate an auction site over the Internet is eBay, Inc. Although auctions provide advantages when selling unique products for which customers are willing to competitively bid, the auction forum is not well suited for sellers desiring to sell large quantities of goods to multiple buyers given the inherent inefficiencies involved with selling one product at a time in a bidding environment.

Yet another costing scheme which has been advanced in recent years is buyer-driven bidding. According to this costing scheme, a single buyer desiring to obtain a product communicates a price at which the buyer is willing to purchase the product to multiple sellers. Each of the sellers is provided an opportunity to review the buyer's price. A sale is complete when one of the sellers agrees to sell the product to the buyer at the price suggested by the buyer. A buyer-driven bidding scheme is described in U.S. Pat. No. 5,794,207 assigned to Walker Asset Management Limited Partnership of Stamford, Conn. Another buyer-driven bidding scheme is provided in U.S. Pat. No. 5,897,620 assigned to priceline.com, Inc of Stamford Conn. While the buyer-driven bidding scheme provides advantages for certain types of transactions when, for example, sellers may be willing to sell products at lower than normal prices, the uncertainties involved with whether a buyer's offer will be accepted is often problematic for high volume commercial transactions in which the reliability that a transaction will be complete is of paramount importance.

While the costing schemes described above have various advantages and disadvantages in different situations, a commonality among all of the costing schemes is that each buyer operates independently with one or more sellers to set a purchase price of a product. For example, in the fixed pricing scheme and discount quantity purchasing scheme, buyers individually determine whether the sellers preset price schedule is acceptable regardless of whether other buyers have decided to purchase the product or not. In an auction, not only do buyers operate independent of other buyers, but, in fact, each buyer's decision to place a bid has a negative effect on all other buyers desiring to purchase the same good since the price of the good increases. Similarly, in a buyer-driven bidding scheme, each buyer is completely unaware of the amount other buyers are bidding for a given product.

The independent operations of the buyers stems from a combination of the fact that: 1) the costing schemes discussed above provide little incentive for buyers to work together and 2) there are large inconveniences for buyers to facilitate communication about their buying activities to other buyers. Unfortunately, such independent operation by buyers can result in missed opportunities for both the buyer and seller. For example, in instances where two independent buyers are unable to afford a product, neither buyer informs the seller of their respective desire to purchase the product. Accordingly, sales of the product to these buyers do not take place. Due to the independent operations by each of the buyers, such information is never communicated thereby resulting in missed opportunities for both the buyers and seller alike.

SUMMARY

The following presents a simplified summary in order to provide a basic understanding of some aspects of the claimed subject matter. This summary is not an extensive overview. It is not intended to identify key/critical elements or to delineate the scope of the subject invention. Its sole purpose is to present some concepts in a simplified form as a prelude to the more detailed description that is presented later.

In brief, the subject disclosure pertains to systems and methods to facilitate e-commerce transactions and demand aggregation. More particularly, mechanisms are provided to assist interaction with and/or establishment of deal rooms, or electronic forums, for buying and/or selling goods and/or services at volume discount as a function of collective room transactions. Both suppliers and consumers can benefit from such deal rooms in various ways. For example, suppliers can utilize deal rooms for optimal production scheduling and/or inventory reduction, while consumers can be grouped and benefit from bulk discounts that may not otherwise be available to them.

While buyers and/or sellers can host deal rooms, intermediaries can also host deal rooms in accordance with an aspect of the claimed subject matter. According to one aspect of the disclosure, a third-party sponsor or maven hosts a buying group and employs an offer discovery component to discover offers of potential interest to the maven's buying group. After selecting an offer, the maven establishes a deal room to facilitate purchasing between the buying group and the seller making the offer.

In accordance with another aspect of the claimed subject matter, a mechanism is provided to track orders by a buying group in the deal room. A current price or discount amount earned by buyers in the buying group is maintained based upon tracked purchases and a price curve. The price curve can be, among other things, a function of a discount amount based on the total amount purchased under an offer. The price curve can be modified by the maven to provide a sales commission.

According to yet another aspect of this disclosure, a system is provided for management of the buying group. The maven can establish and manage various aspects of the buying group. For example, the maven may add or remove a buyer from the buying group for violating of the terms and conditions of the buying group. The maven may also add or remove sellers available to the buying group.

In accordance with an aspect of the claims, mechanisms are provided to facilitate discovery of buying groups and/or sellers. Geographical relationships among buyers in the buying group may be utilized to locate new sellers that may have an interest in making an offer to the buying group. Further, a buyer can find buying groups to join by supplying a search engine with specified criteria (e.g., type of product and/or service, price, geographical area . . . ).

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 12 illustrates an on-line registration form for a buyer.

FIG. 21 is a seller's offer information input screen.

DETAILED DESCRIPTION

The subject disclosure pertains to demand aggregation between and amongst a plurality of buyers and sellers. More specifically, the disclosure is related to mechanisms that facilitate hosting of electronic deal rooms including price curves that vary as a function of an amount of product ordered/purchased. In accordance with one embodiment, deal rooms can be hosted by third parties or mavens. These mavens can act as intermediaries between buyers and sellers to promote interaction and commercial transactions between the parties. Such third party activity can be encouraged via monetary incentives, among other things. Various systems and methods are described hereinafter with respect to third party deal room hosting as well as relevant tools to aid such functionality.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
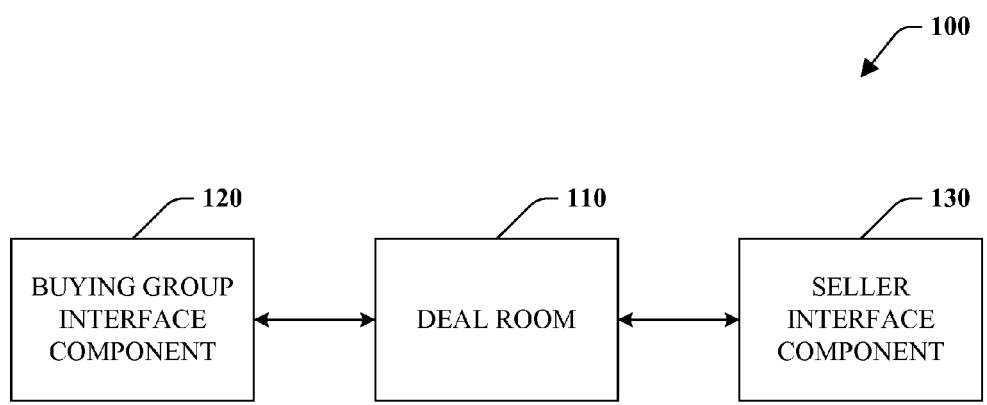
FIG. 1 is a block diagram of a demand aggregation system.

Referring initially to FIG. 1, an electronic commerce system 100 is illustrated. System 100 includes a deal room component 110 to facilitate a commercial transaction between a buyer and a seller. The commercial transaction can include an offer to sell particular goods and/or services wherein a final price of the goods and/or services is a function of the total number of orders received by the seller. The offer may also comprise a specified time period in which any goods and/or services of a seller may be purchased. At the conclusion of the specified time period, a final discount amount can be determined as a function of the total amount purchased (e.g., quantity of product, total sales, amount of money spent . . . ). In accordance with one embodiment of the subject disclosure, the offer can be a flash offer. A flash offer is a short-lived offer that provides a greater discount or extra benefit. For example, a seller may create a flash offer wherein the buyer has 45 minutes to place an order. The buyer receives the final discount amount and an extra benefit (e.g., an extra 5% discount) for ordering under the flash offer. The deal room component 110 is communicatively coupled to a buying group interface component 120 and a seller interface component 130. The buying group interface component 120 and seller interface component 130 can facilitate interaction between one or more buyers in a buying group and at least one seller.

By way of example, a seller can employ the seller interface component 110 to create and present an offer to the deal room component 110. The seller interface component 130 can also notify a seller of orders received under an offer in the deal room component 110. Likewise, the buying group interface component 120 can facilitate receipt or retrieval of an offer from the deal room component 110 and provisioning of orders from buyers in a buying group with respect to a particular offer.

Figure 2:
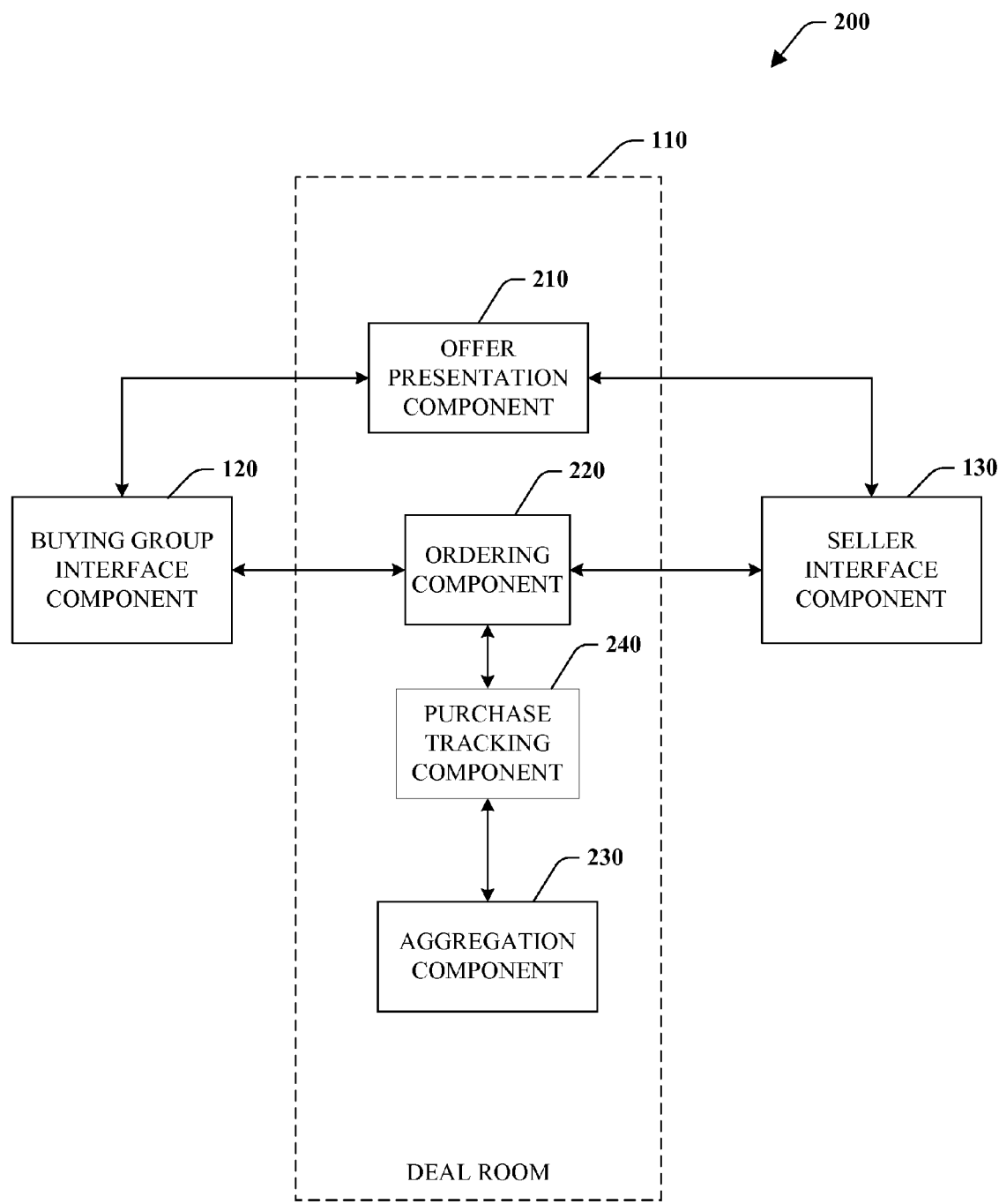
FIG. 2 is a block diagram of a demand aggregation system including a representative deal room.

FIG. 2 depicts an electronic commerce system 200 including a representative deal room component 110. Deal room component 110 includes an offer presentation component 210 that stores an offer of the deal room gathered from the seller via the seller interface component 130 and communicates the offer to buyers in the buying group through the buying group interface component 120. Accordingly, the offer presentation component 210 can maintain deal room offers and provide guidelines for commercial transactions conducted utilizing the deal room component 110. For example, the presentation component 210 can enforce seller terms and conditions or restrictions on buyers that can access the deal room and/or offers provided therein.

The deal room component 110 also includes an ordering component 220. The ordering component 220 provides a mechanism to initiate and complete an order for goods and/or services under the offer of the deal room. Buyers, via the buying group interface component 120, can elect to purchase goods and/or services presented by the offer presentation component 210. Ordering component 220 is operable to accept orders and communicate the orders to the seller interface component 130 so that it may be provided to the seller for further processing. The ordering component 220 can also notifies buyers that the order was accepted and forwarded to the seller. Additionally, the ordering component 220 is communicatively coupled to a purchase tracking component 240 and the details of the order are provided thereto.

While the ordering component 220 and purchase tracking component 240 are depicted as contained in deal room 110, it is to be appreciated that these components may be distinct from deal room 110. For example, in one embodiment, ordering component 220 can be a checkout register in a store location of the seller. A special coupon code or bar code corresponding to the offer and the buying group is utilized when making a purchase at the store location. The special coupon code or bar code enables the purchase tracking component 240 to link the in-store purchase to the buying group and other purchases made in the deal room and elsewhere. In yet another embodiment, a buyer in the buying group utilizes a credit card when making a purchase at a store location in accordance with the offer. The buyer, when joining the buying group, can supply a credit card number that can be utilized for group buying purchases. When charging a purchase under the offer to a credit card, the seller and the credit card number are matched to the buying group and the offer available to the buying group. Accordingly, the purchase tracking component 240 receives notice of the credit card charge and records the purchase as part of the buying group's group buy under the offer. Thus, while the deal room 110 provides a consolidated means to facilitate purchases and to track purchases, it is to be appreciated that purchases of the buying group can be tracked by any option capable of linking a purchase to the buying group and offer.

The aggregation component 230 receives notifications from the purchase tracking component 240 whenever buyers place orders in the deal room. The aggregation component 230 records the orders of all buyers in the buying group in order to determine a final price or a final discount amount depending on the offer. In one instance, the offer is for specific goods and/or services will include a price curve for the goods and/or services. The price curve is, among other things, a function of a price of a good and/or service based on the total quantity ordered. For example, if the total quantity ordered is 100 units, the unit price may be $10/unit and if the total quantity ordered is 200 units, the unit price may be $8/unit. In another instance, the offer is for any good and/or service of a seller. A discount curve is provided with the offer and is a function of a discount amount based on the total amount purchased. For example, if the buying group purchases goods and/or service totaling $1000, the buying group may receive a 2% discount off the total. If the buying group purchases a total amount of $2000, the group may receive a 4% discount.

The aggregation component 230 populates the recorded orders on a price curve or a discount curve and utilizes such a curve to determine the current price or discount based upon the orders tracked thus far. At the end of the offer period, the aggregation component 230 provides the final price or final discount given to the buying group. It is to be appreciated that movement on the price curve or discount curve can occur in both directions. For example, movement in the forward direction (i.e., towards a lower price and/or greater discount) occurs as the total purchase amount of the buying group increases. However, movement can occur in the reverse direction (i.e., towards a higher price and/or lesser discount) when a purchase product is returned to the seller. Thus, if the purchased product is returned for a refund, the return and refund is reflected by a reduction in the total purchase amount of the buying group and, subsequently, by a change in the final price and/or discount.

Figure 3:
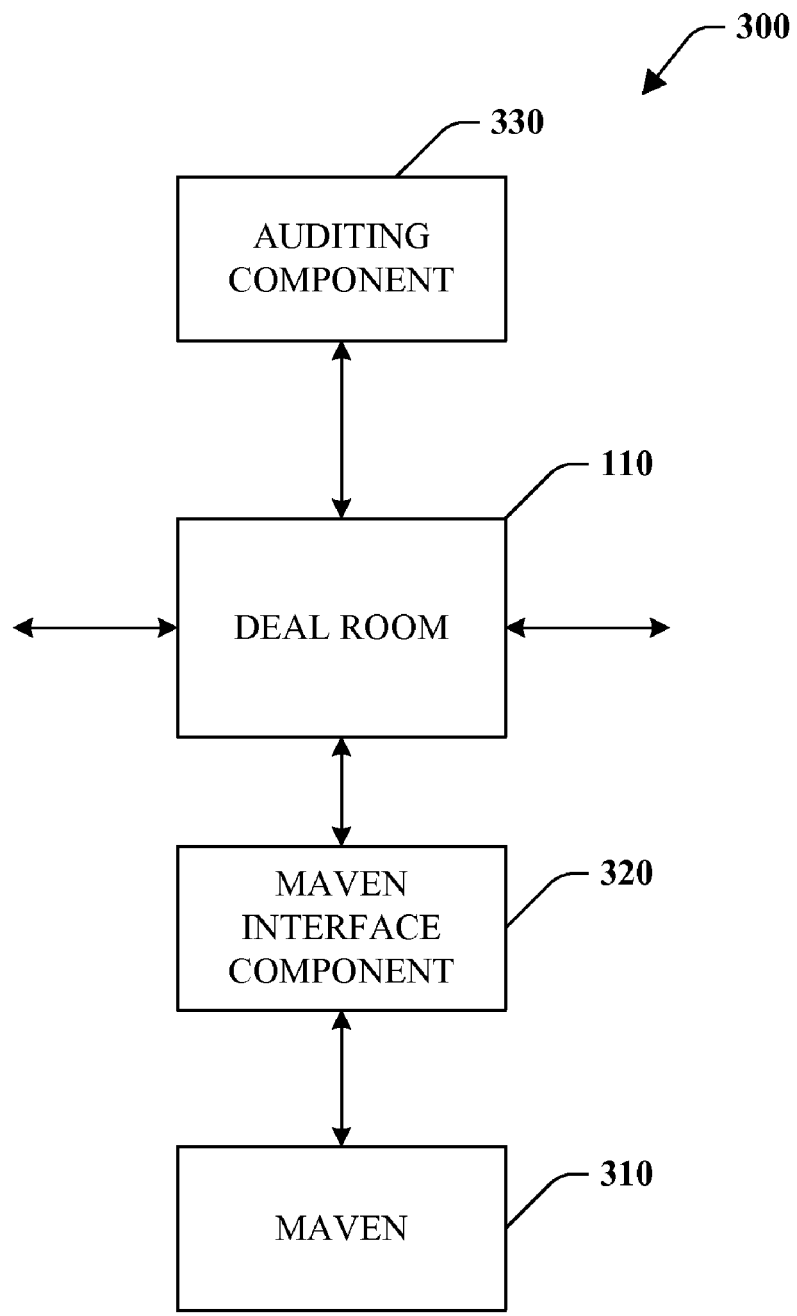
FIG. 3 is a block diagram of demand aggregation system including a host.

Turning now to FIG. 3, a hosted electronic commerce system 300 is illustrated. System 300 includes a host or maven 310 that hosts and controls the deal room component 110 via a maven interface component 320. In one embodiment, the maven 310 is a third-party intermediary. For example, the maven 310 can be an individual, an organization, a corporation, a school, a church or any other non-profit or for-profit entity. It is also to be appreciated that the maven 310 need not be a third-party to the underlying transaction facilitating by the deal room component 110. For example, a buyer or a seller can assume the role of maven 310 and host the deal room.

The maven 310 establishes an opportunity for commerce between a buying group and a seller. In one instance, the maven 310 can discovers an offer from a seller and/or encourage a seller to join the deal room. Additionally or alternatively, the maven 310 can create and/or manage a buying group. By way of example, the maven 310 can invite potential buyers to join a buying group and benefit from demand aggregation with respect to offers gathered by the maven 310 and established in deal room component 110.

The maven 310 can be incentivized for facilitating interactions between buyers and sellers. For example, a price or discount curve provided with an offer from a seller, for instance, can be modified by maven 310 to include a sales commission to maven 310 as compensation for hosting the deal room component 110. Additionally or alternatively, maven 310 may take a 1% sales commission on all purchases through the deal room component 110. The sales commission can be taken from the discount curve. In other words, a seller may offer a 4% discount if the purchase total is $2000 but the buying group will receive a 3% discount on such a purchase total thus reflecting the sales commission taken by the maven 310.

In one embodiment of the subject disclosure, system 300 includes an auditing component 330 that monitors activity in the deal room 110. Activity in the deal room 110 is monitored so the auditing component 330 can ensure sellers are adhering to discounts detailed in the offers. Thus, sellers can be held accountable for failing to provide the agreed discount to the buying group. While auditing component 330 is depicted as a distinct object, it should be appreciated that the auditing component 330 can be contained in the maven 310, the maven interface component 320 or distributed across both. Alternatively, according to another embodiment, the auditing component 330 can be included in a third-party service distinct from the maven 310, buyers and sellers.

Figure 4:
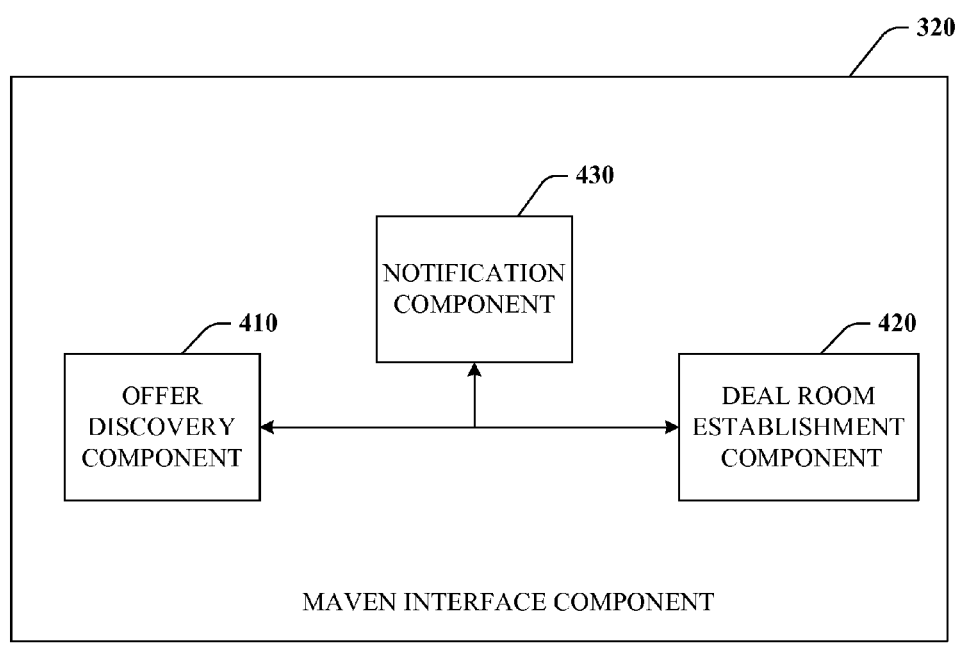
FIG. 4 is a block diagram of representative tools available to a host.

Referring now to FIG. 4, a representative maven interface component 320 is depicted. The maven interface component 320 includes an offer discovery component 410. The offer discovery component 410 facilitates selecting an offer to provide to a buying group. The offer discovery component 410 can include or be embodied as a search engine, for example, that retrieves available offers based upon supplied criteria. The offer discovery component 410 can also provide a list of sellers available to the maven. A maven 310 can subsequently select one or more sellers and view offers available through the one or more sellers. The maven 310 can then select an available offer to provide to the buying group in a deal room. It is also to be appreciated that a seller can contact a maven 310 with an offer it would like the maven 310 to manage for example via the discovery component 410 or alternative mechanism. In this manner, the discovery component 410 can not only search out offers but also simply receive them.

According to one aspect of the subject disclosure, the discovery component 410 can receive a flash offer from a seller available to the maven 310 or otherwise already providing a typical offer to the maven's buying group. As flash offers are only active for a short period of time, the discovery component 410, communicatively coupled to a notification component 430, can immediately inform the buying group of the flash offer.

A deal room for a selected offer can be established by the deal room establishment component 420 (also referred to simply as establishment component 420). The maven utilizing the deal room establishment component 420 creates the terms and conditions of the deal room. A sales commission, if taken, can also be set via the establishment component 420. Once the establishment component 420 launches a deal room, the notification component 430 communicates to the seller and/or a buying group that a new offer is available and in a deal room. The notification component 430 may notify the buyers of the buying group and the seller via a directed communication method such as e-mail, text message, telephone or the like. The notification component 430 may also advertise the new deal room by a posting on a web site or electronic forum. After the creation of the deal room by the deal room establishment component 420, buyers and sellers may interact via the deal room as described supra with reference to FIGS. 1 and 2.

Figure 5:
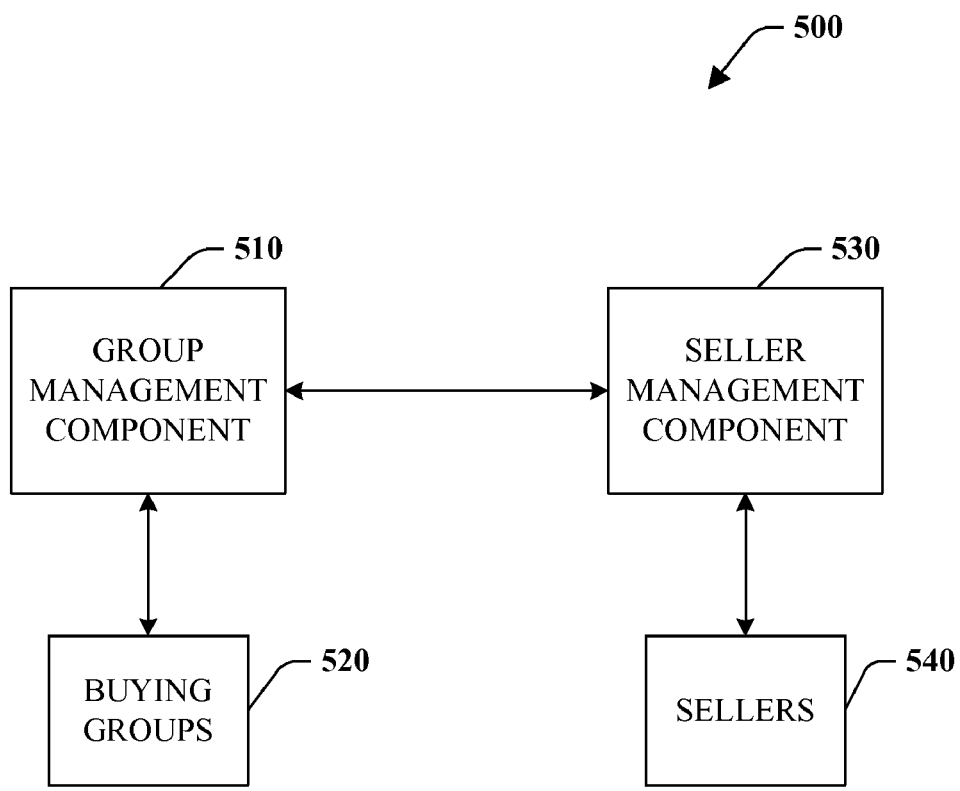
FIG. 5 is a block diagram of a buying group management system.

Turning to FIG. 5, a management system 500 is illustrated employable by a maven and/or included within the maven interface component 320 of FIG. 4. System 500 includes a buying group management component 510. Group management component 510 enables a maven to control the status of a buying group 520 and/or membership therein. For example, terms and conditions can be established that must be accepted before a buyer may join the buying group 520. While this can regulate member action, it can also be used by a maven to control to whom offers are presented and/or particular price curves provided thereto. For example, a maven may limit offers to a particular group of individuals, as a function of group membership (e.g., friends, family, school members, employees . . . ), credit score or any other discriminating factor. Similarly, different price curves can be provided to different groups of users in one or more deal rooms, wherein aggregation can occur by price curve or deal room or across multiple price curves or deal rooms.

It is also to be appreciated that the group management component 510 can facilitate filtering out users of a larger group based on some additional criteria. For example, the group management component 510 can enable a maven to rank buyers in a buying group 520 based upon purchasing histories of individual buyers. In this way, the most active buyers can be determined. A buyer can also be removed from the buying group 520 by the buying group management component 510 if, for example, the buyer violates the terms and conditions of the buying group 520.

System 500 also includes a seller management component 530 that can be employed by a maven to control sellers 540 available thereto. A new seller can be added to the sellers 540 available to the maven. Further, an existing seller may be removed from the sellers 540 for violating terms and conditions or any other reason. The seller management component 530 enables a seller linked to an existing deal room to be switch out with another seller from the available sellers 540 if a more attractive but similar competing offer is discovered in the short term. The seller management component 530 provides statistical measurements such as which sellers 540 are producing the largest sales volumes or which sellers are generating the greatest commission for the maven. The maven can also retrieve histories of sellers 540 that include previous offers, order volumes, discount totals and the like via the seller management component 530.

Figure 6:
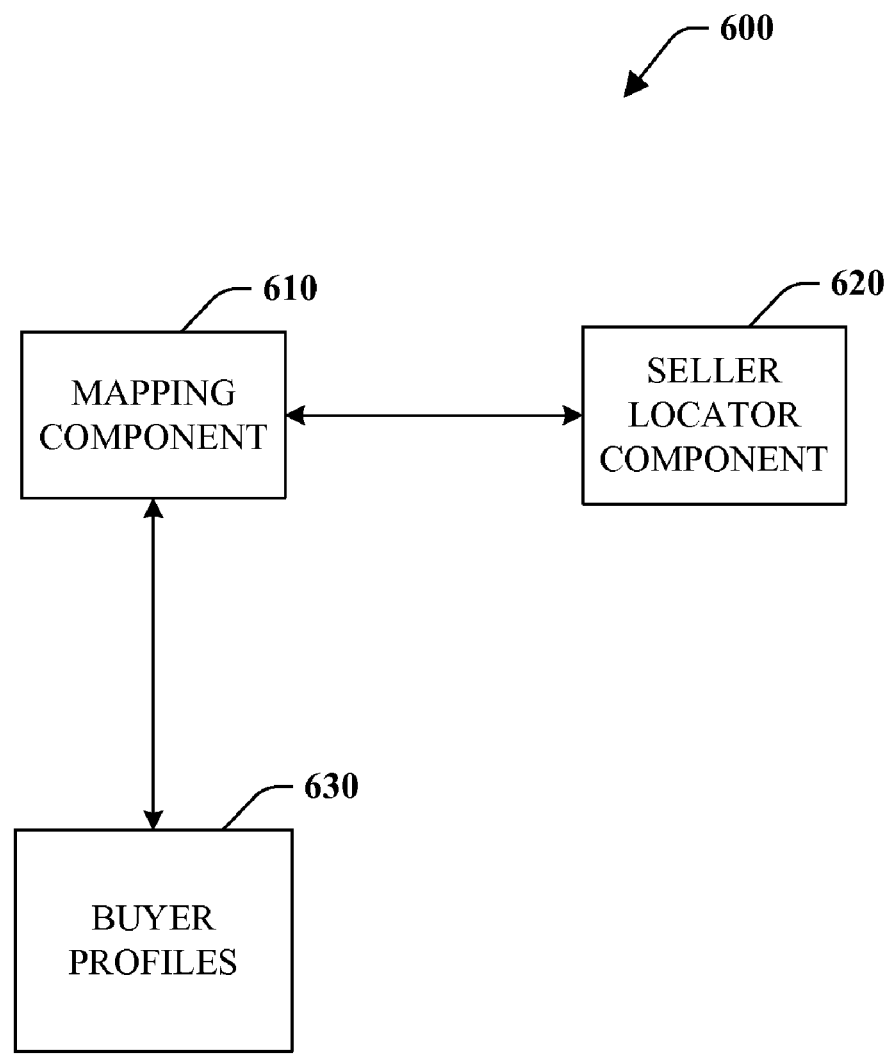
FIG. 6 is a block diagram of a geographical mapping system.

FIG. 6 depicts a geographical mapping system 600 including a mapping component 610 that can be employed by a maven or included within maven interface component 320 of FIG. 4. Geographical mapping system 600 provides the maven with another manner in which to introduce new sellers and items to the buying group and otherwise expand the product selection available to the buying group members. While offer discovery component 410 in FIG. 4 enables the maven to retrieve new offers from sellers participating in demand aggregation, geographical mapping system 600 provides a different modality to locate and review those sellers. Additionally, system 600 enables the maven to locate sellers not currently participating in demand aggregation but may, nonetheless, be interested in offering specials to the maven's buying group.

Mapping component 610 determines geographical relationships among buyers in a buying group that can be utilized to, among other things, locate sellers that may be interested in providing an offer to the buying group. A buyer may complete a buyer registration form including an address when the buyer joins a buying group. The information from the buyer registration form can be stored in buyer profiles 630 of the buyers in the buying group. The mapping component 610 can utilize the stored buyer profiles 630 and make a graph of the buyer locations. The mapping component 610 can integrate with other mapping tools (e.g. MapQuest, Google Maps, Windows Live . . . ) to depict buyer locations on a street map. The mapping component 610 enables a maven to efficiently discern the geographical distribution of buyers in a buying group. The mapping component 610 is communicatively coupled to a seller locator component 620 to facilitate discovery of new sellers, offers, products and services.

Seller locator component 620 utilizes geographical relationships determined by the mapping component 610 to reveal sellers in a geographical area that may be interested in offering specials to the maven's buying group. Seller locator component 620 may search amongst sellers participating in hosted demand aggregation systems hosted by other mavens. Sellers discovered by the seller locator component 620 can be managed by the seller management component 530 described with respect to FIG. 5. Further, the seller locator component 620 may also integrate with other mapping tools similar to the mapping component 610. For example, the seller locator component 620 may utilize features of other mappings tools to locate businesses in a particular geographical area offering certain products and/or services. The maven can contact these businesses and encourage them to offer specials and participate in volume pricing.

In accordance with one embodiment, mapping system 600 operates on an individual buyer level. If a buyer in a buying group subscribes to a membership in the buying group, the mapping component 610 periodically receives data relating to the buyer's location. The mapping component 610 can utilize the seller locator component 620 to find sellers and/or offers base upon and near the buyer's location. The mapping component 610 can ping the buyer's mobile device (e.g., cell phone, PDA, blackberry . . . ) to notify the buyer of the nearby sellers and/or offers. The notification can be a text message, a voicemail message, an e-mail message or the like. Accordingly, the buyer can continuously receive special offers while moving around to different locations.

Figure 7:
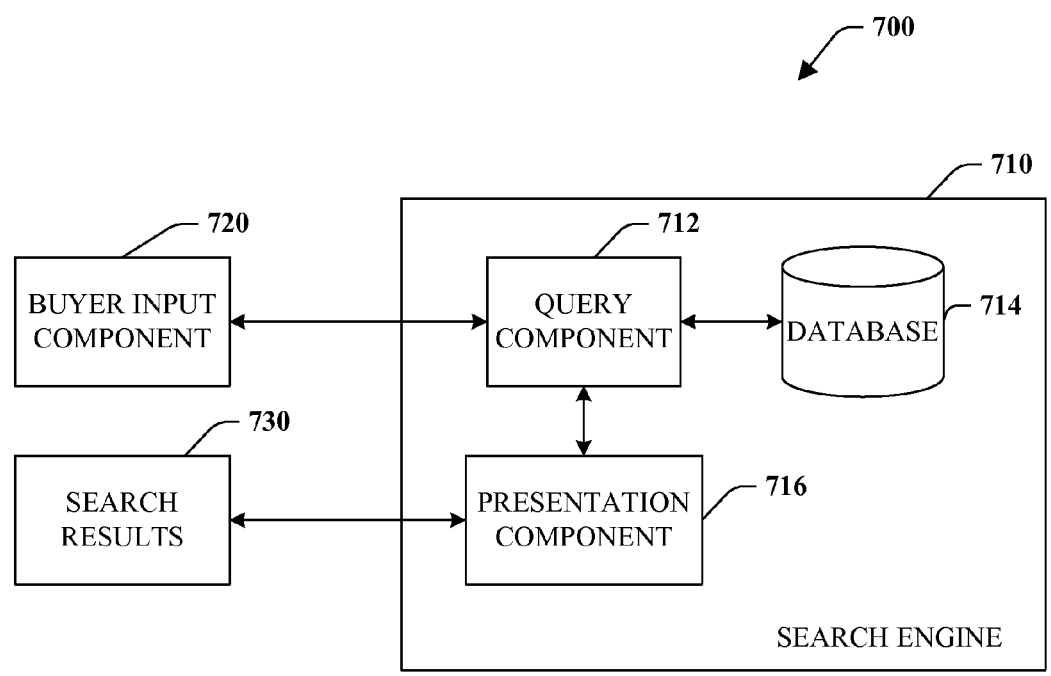
FIG. 7 is a block diagram of a group buying search engine.

Referring next to FIG. 7, a group buying search engine system 700 is illustrated. A buyer input component 720 submits a query to a search engine 710 to generate search results 730. The query from the buyer input component 620 includes criteria supplied by a potential buyer. The query may include a product and/or service or a class of products and/or services. For example, the query may be for "teddy bears" or "children's toys." The search results 730 returned by the search engine 710 include buying groups containing offers for the product and/or service or class of products and/or services included in the query. The potential buyer reviews search results 730 and selects one or more buying groups to join in order to participate in a group buy as described with respect to FIGS. 1 and 2.

Search engine 710 includes a query component 712 that is communicatively coupled to the buyer input component 720. Query component 712 receives the query and accesses a database 714 to retrieve matching buying groups and/or offers. Information retrieved from database 714 is conveyed to a presentation component 716. Presentation component 716 processes the information and generates the final search results 730. The presentation component 716 can rank buying groups and/or offers from the query component 712 based upon various criteria. For example, the matching buying groups may be sorted according to current lowest price, lowest potential price, number of members, number of active buyers, or the like. Presentation component 716 may also utilize geographical data to provide a potential buyer with relevant buying groups based upon the potential buyer's location. For example, the potential buyer may desire participating sellers within a particular geographic area. The presentation component 716 will include buying groups with offers from those sellers in the search results 730. Results can also be filtered by the presentation component 716 as a function of a stored profile or other ascertainable information about a potential buyer (e.g., age, ethnicity, marital status, political affiliation, credit score, group memberships . . . ) and/or any other contextual information (e.g., time, date, holiday, event . . . ). In this manner, potential buyers can be married with the most relevant buying groups including, for example, only those in which it would satisfy membership requirements.

Figure 8:
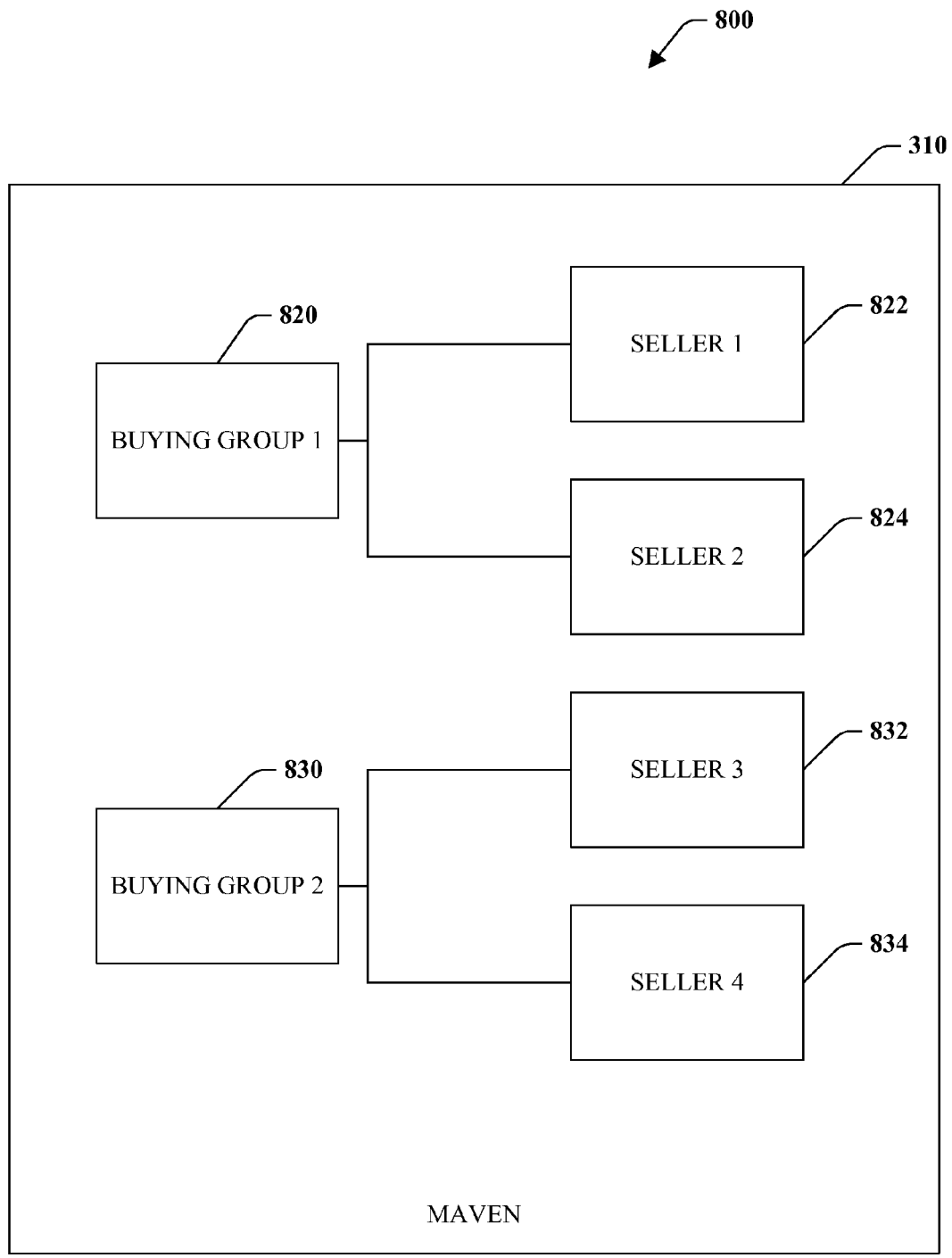
FIG. 8 is a block diagram of a representative host or maven.

Referring to FIG. 8, a graphical representation of a host or maven 310 is illustrated to facilitate clarity and understanding. As shown, maven 310 can host more than one buying group. For example, maven 310 hosts buying group 820 and buying group 830. Each buying group 820 and 830 can be provided more than one offer from one or more sellers. For example, maven 310 hosts two offers, one from seller 822 and one for seller 824, and facilitates transactions between sellers 822 and 824 and buying group 820 under the offers. Likewise, maven 310 facilitates transactions between sellers 832 and 834 and buying group 830 under offers provided to buying group 830.

Maven 310 can establish a variety of relationships among the buying groups and/or sellers. For example, the maven 310 can establish a cross-selling offer between buying groups. Thus, the maven 310 can facilitate commercial transactions not only among sellers and buying groups, but among several buying groups as well. Cross selling transactions amongst buying groups are tracked and recorded similar to buyer/seller transaction described in relation to FIG. 2.

According to another aspect of the subject disclosure, buying groups can be combined, split and/or linked. For example, buying groups 820 and 830 can be merged into a single buying group. All the sellers and offers available to either buying group 820 or 830 become available to the merged buying group. A new buying group may be created by splitting or spinning off from an existing buying group. Maven 310 may allow a buyer in a buying group to create a spin-off buying group linked to the parent. For example, buying group 820 can be created and sponsored by maven 310. A buyer in buying group 820 may desire to create a new buying group. Maven 310 can sponsor the buyer and create buying group 830 as a spin-off of buying group 820. The purchase volume from buying groups 820 and 830 are combined or linked to increase overall purchase volume. Sales commissions derived from the buying group purchases can be split between maven 310 and sponsored buyer based upon terms and conditions established prior to spinning off. If allowed by the terms and conditions, buying group 830 can later by unlinked from buying group 820 to become a distinct buying group separate from maven 310.

Figure 9:
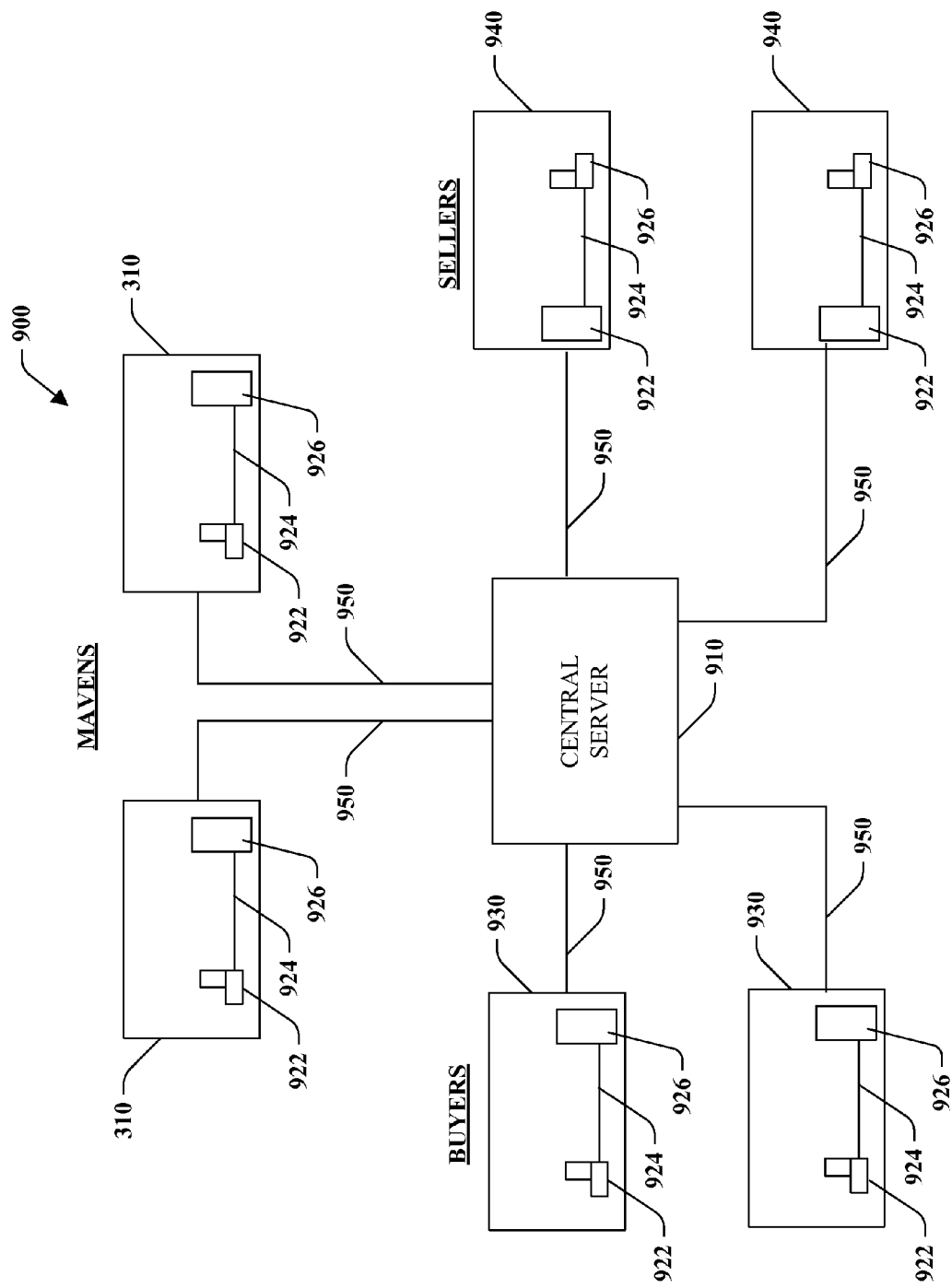
FIG. 9 is a block diagram of a system for electronically conducting business.

Referring initially to FIG. 9, a hosted demand aggregation system 900 is shown in which multiple mavens 310, buyers 930 and sellers 940 are electronically linked via a central server 910. As discussed in more detail below, the central server 910 is configured to provide the mavens 310 a place to host a convenient forum in which the buyers 930 and sellers 940 utilize to buy and sell goods and/or services. The forum may be an Internet web page, for example, established by mavens 310 where mavens 310 can post select product information from sellers 940 and the buyers 930 can order products.

The multiple criteria buying scheme calls for a seller 940 to provide a number of deals for a given product, which vary according to different offering criteria defining the limits of a number of selling criteria, such as, for example, price, volume, quality and delivery time. The buyers 930 can enter a range of criteria that the buyer would require for a deal to be made. A list of sellers and prospective deals offered by sellers 940 is generated for the buyers 930 to review. The buyers 930 can then review the list of deals and choose a deal based on the buyers' 930 particular needs. In this manner, the buyers 930 can be certain that particular thresholds have been met.

It is to be appreciated that the present invention has wide applicability to the purchasing and/or selling of a variety of different products and/or services. For example, the present invention may be applied within the context of purchasing and/or selling airline tickets wherein buyers' criteria may include, for example: (1) reputation of airline; (2) reliability; (3) timeliness; (4) price; (5) number of alternative flights; (6) comfort; (7) quality of service; and (8) quality of foods. The sellers' criteria may include, for example: (1) volume of tickets; (2) buyer's versatility in time schedule; (3) buyer's method of payment, etc.

The subject innovation may also be applied in the context of purchasing and/or selling an automobile wherein buyer's criteria may include, for example: (1) reputation of automobile manufacturer; (2) reputation of dealer; (3) price of automobile; (4) delivery options; (5) automobile availability; (6) safety; and (7) financing terms; etc. While, the seller's criteria may include, for example: (1) buyer's creditworthiness; (2) desired finance terms; (3) delivery requests of buyer; (4) delivery dates; etc.

Thus, the subject aspects of the claimed innovation allow buyers and/or sellers of products and/or services to pre-select a plurality of criteria prior to negotiating a deal for the product and/or service. Of course, the pre-selected criteria will vary depending on the particular product and/or service. The scope of the subject invention as defined in the hereto appended claims intends to include any product and/or service (and plurality of pre-selected criteria associated therewith) suitable for deal-making in accordance with the described aspects of the innovation.

Each of the mavens 310, buyers 930 and sellers 940 may access the central server 910 in any of a variety of ways. For example, in the subject embodiment each maven 310, buyer 930 and seller 940 is shown to be part of separate establishments, which include one or more respective computer systems 922 and local servers 926. The computer systems 922 may, for example, be a desktop or laptop computer with a local area network (LAN) interface for communicating over a network backbone 924 to the local server 926. The local servers 926, in turn, interface with the central server 910 via a network cable 950 or the like. It will be appreciated that while the present aspect depicts the computer system 922 communicating with the central server 910 via hardwired network connections. In an alternative aspect, the computer system 922 may interface with the central server 910 using a modem, wireless local area and/or wide area networks, etc. Further, it will be appreciated, that while the mavens 310, buyers 930 and sellers 940 are shown to communicate with the central server 910 via different computer systems 922, it will be appreciated that the mavens 310, buyers 930 and/or sellers 940 may access the central server 910 from the same computer system 922.

The aforementioned systems, architectures, environments and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the offer discovery component 410 can employ such mechanisms to intelligently locate relevant offers. Likewise, the group management component 510 can employ similar mechanism to identify/filter group buy members, for example by mining user profile data.

In view of the exemplary systems described supra, methodologies and means that may be implemented in accordance with the disclosed subject matter will be better appreciated with reference to FIGS. 10-20 including a plurality of exemplary screenshots/webpages and methodologies. These figures and related text are provided solely to facilitate clarity and understanding and are not intended to limit the scope of the appended claims. In accordance therewith, the screenshots are illustrative of only one of many manners of which graphics and text can be combine. Furthermore, it is to be noted that for purposes of simplicity of explanation, methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies and means described hereinafter.

Figure 10:
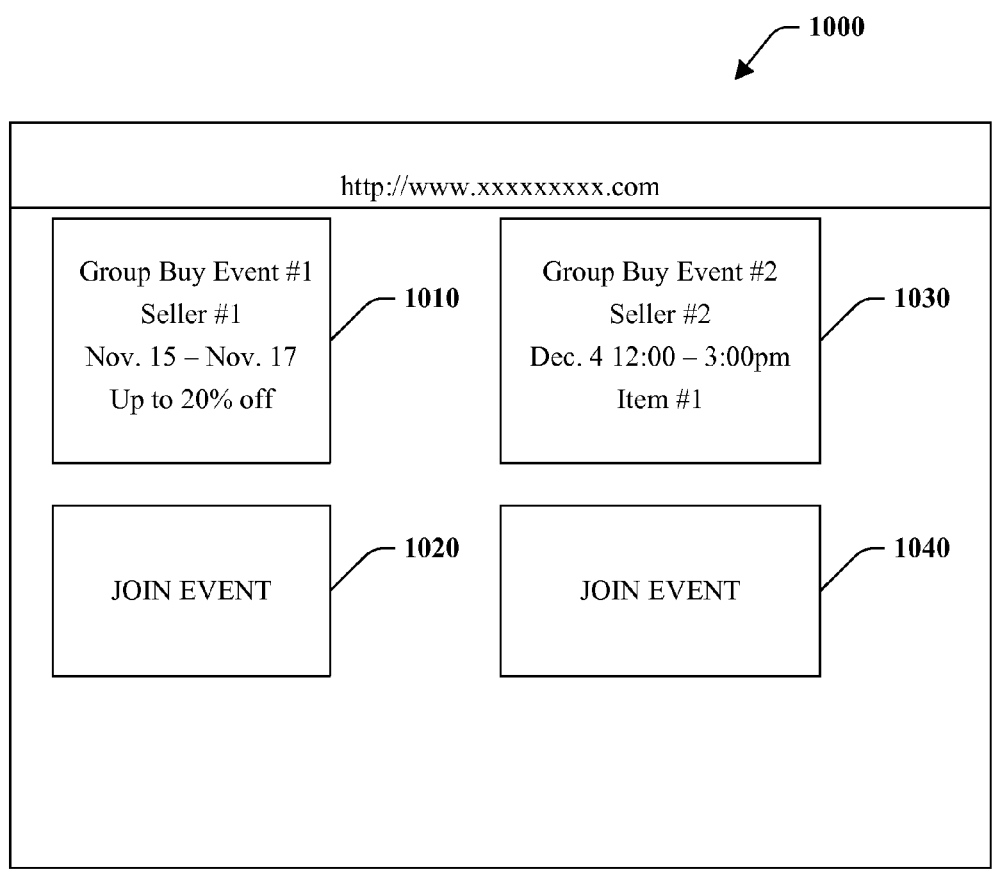
FIG. 10 illustrates a web page providing options to buyers desiring to conduct business electronically as a member of a buying group.

Turning now to FIG. 10, an exemplary web page 1000 is illustrated that can be generated and/or otherwise utilized by a maven to attract buyers. A maven may create and post web page 1000 to advertise hosted buying groups and/or particular group buying events to potential buyers. The web page 1000 provides potential buyers options to view group buy offers and join the corresponding buying group. For example, web page 1000 depicts information panels 1010 and 1030 providing the details of group buy events. Hyperlinks 1020 and 1040 are provided so that potential buyers may elect to join a buying group and participate in the group buy events displayed in panels 1010 and 1030.

In accordance with embodiment, web page 1000 can be generated and/or utilized by an affiliate distinct from the maven. The affiliate advertises the maven's buying groups and/or group buy events on behalf of the maven. If potential buyers utilizing links 1020 and 1040 on the affiliate's website ultimately become members of buying groups, the affliate's website is recorded as a referring website as part of a member profile. The affiliate receives a commission or other compensation based upon the number of referrals or other such metric. For example, the maven pays a flat rate for each new member that joined via the affliate's website. In another embodiment, the affiliate receives a percentage of the maven's commission on the purchases made by members referred by the affiliate.

Figure 11:
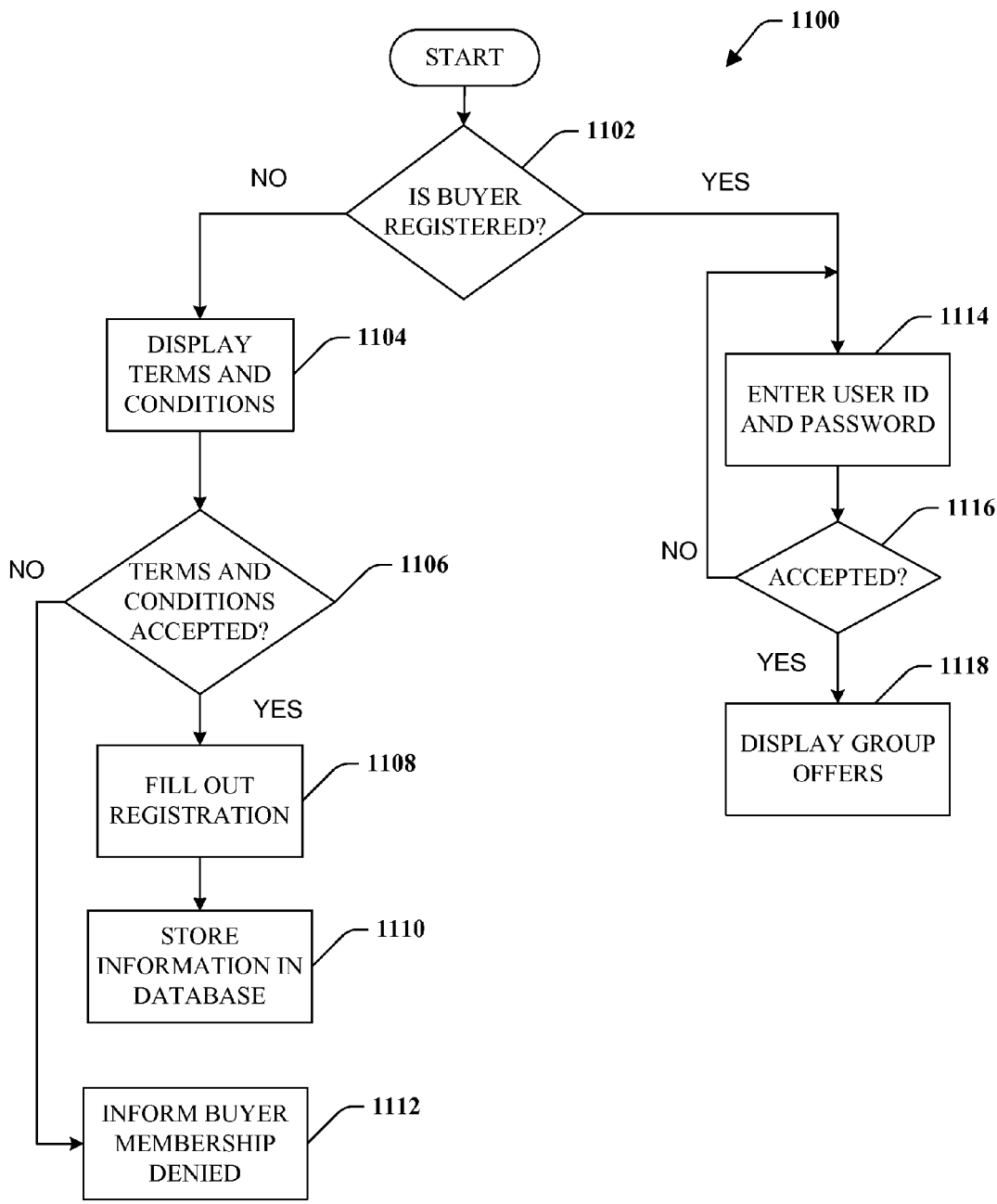
FIG. 11 is a flow chart diagram for a buyer desiring to conduct business electronically as a member of a buying group.

Referring now to FIG. 11, the general actions taken by a potential buyer desiring to join a buying group through web page 1000 is shown via flow chart diagram 1100. More particularly, at reference numeral 1102 it is initially determined whether a potential buyer is already a registered member of the buying group. If the potential buyer is not registered, terms and conditions of membership in the buying group are displayed at 1104. The potential buyer is presented with a choice at 1106 whether or not to accept the terms and conditions. If the potential buyer does not accept the terms and conditions at 1106, the potential buyer is informed at 1112 that membership in the buying group is denied. If the terms and conditions are accepted, the potential buyer fills out a registration form. For example, the potential buyer fills out a registration form 1200 such as that shown in FIG. 12. In this example, registration form 1200 requests that the buyer enter the following information: buyer name; address; telephone; fax; e-mail; preferred contact method; preferred user name; and preferred password. With respect to the user name and password, if the selected user name and password combination are unavailable, the potential buyer is prompted to enter a new user name and password until an available combination is supplied.

If at 1102, a potential buyer has already registered, the buyer may login as a registered user by entering a user name and pass code when prompted at 1114. Upon entry of such information, the user name and password is verified at 1116 with the information in the database at 1110. If the user name and pass code entered by the buyer does not match any entry in the database, the buyer returns to 1114 for re-entry of a user name and pass code. If, however, at 1116, a valid user name and pass code are entered, group offers available to the buying group are displayed at 1118.

Figure 13:
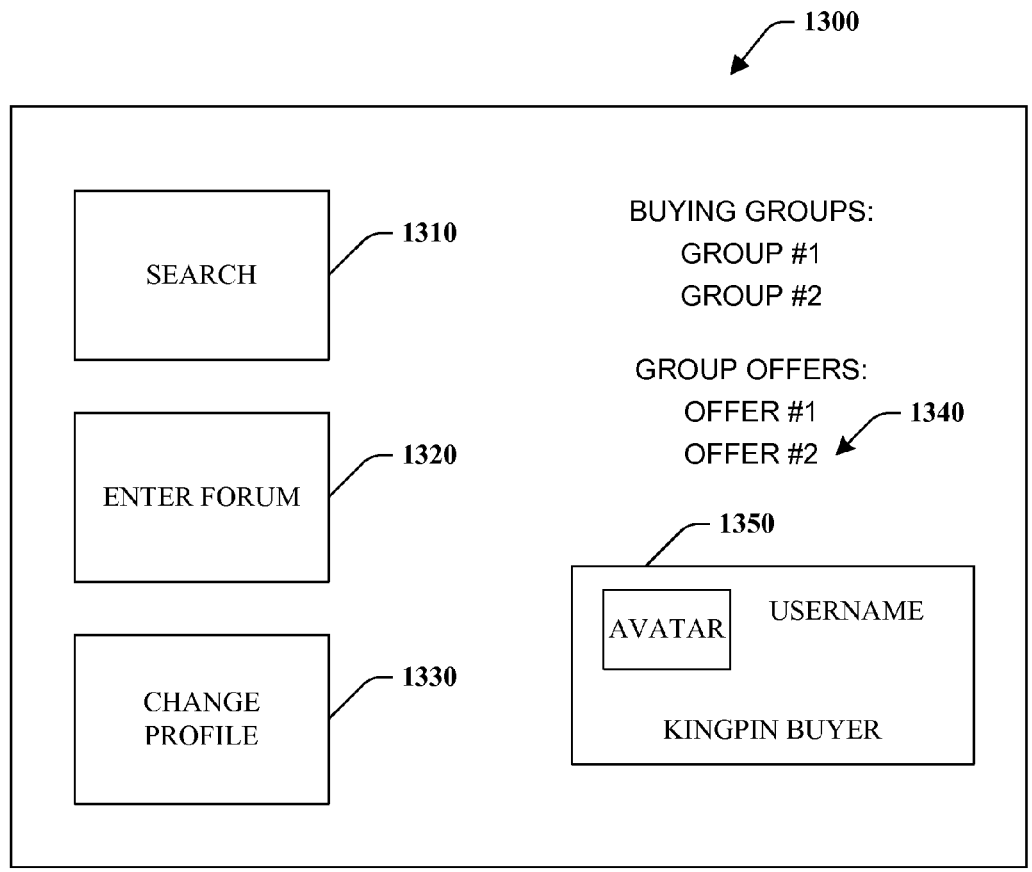
FIG. 13 illustrates an exemplary buyer home screen.

Referring now to FIG. 13, an exemplary buyer home screen 1300 is illustrated. Home screen 1300 can be displayed at reference numeral 1118 of FIG. 11. Home screen 1300 displays a list of buying groups in which the buyer is a member and a list of offers currently available to one or more of those buying groups. Home screen 1300 also includes various hyperlinks 1310, 1320, 1330 and 1340 employable to access aspects of the system. For example, hyperlink 1310 enables a buyer to utilize a group buying search engine as described with reference to FIG. 7. The buyer employs the search engine to find new buying groups to join. Hyperlink 1330 enables the buyer to change elements of the buyer profile. A form similar to form 1200 of FIG. 12 is displayed to accept profile changes.

In one embodiment, hyperlink 1320 is provided to allow buyer access to a community forum. The community forum enables buyers, mavens and sellers to interact amongst one another. These interactions can take the form of blogs, e-mails, bulletin boards and the like. To facilitate interaction, each buyer has a buyer card 1350. Buyer card 1350 includes an avatar, a user name and a buyer status identifier. The avatar is a symbol or graphical representation of the buyer. The avatar facilitates interactions in the community forum by providing a visual representation of buyers. The user name is the user name supplied during registration as described with reference to FIG. 11. The buyer status identifier categorizes the buyer according to the buyer's purchase volume. For example, once a buyer reaches a purchase volume threshold, the buyer is tagged with a status such as "kingpin buyer" in the case of a high volume buyer. Accordingly, mavens, sellers and other buyers can recognize high volume active buyers by the buyer card associated with a particular buyer.

Figure 14:
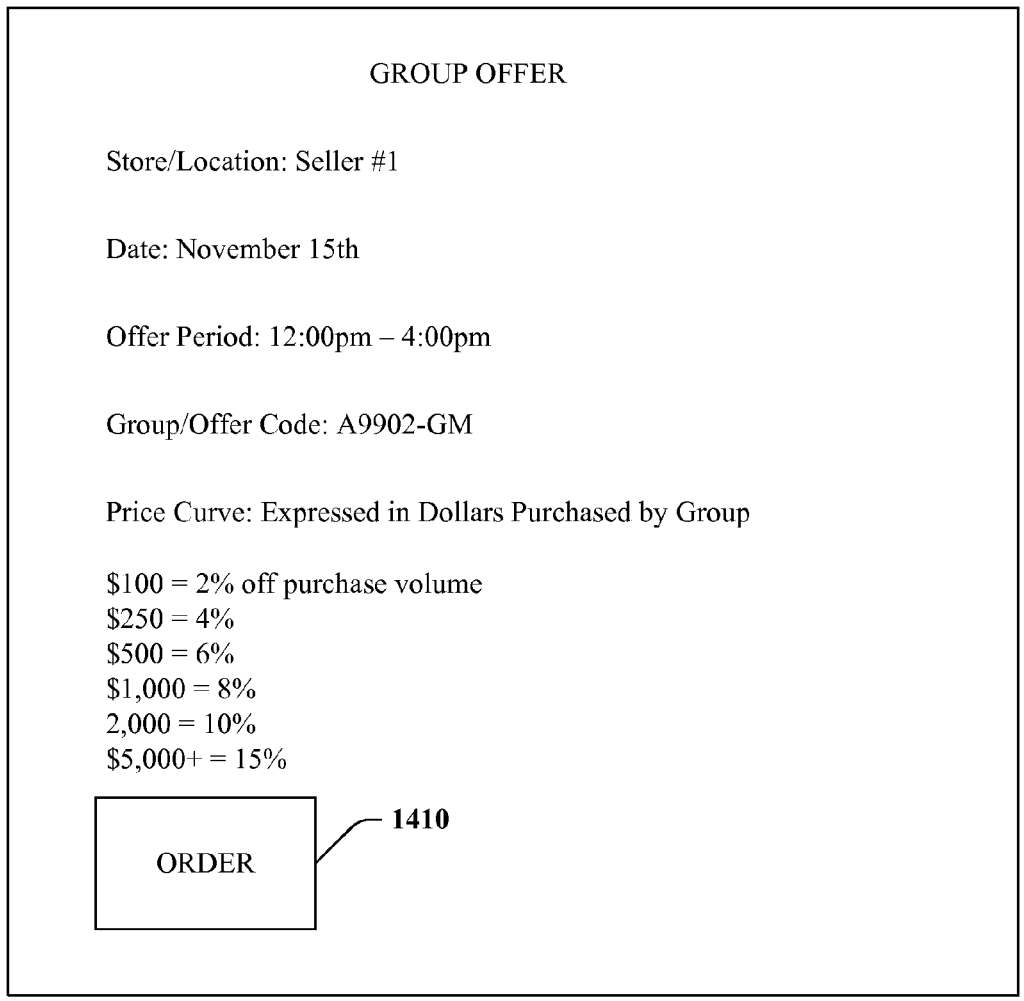
FIG. 14 illustrates a group buying offer in accordance with one aspect of the disclosure.

Turning now to FIG. 14, an exemplary group offer 1400 is illustrated. Group offer 1400 may be displayed by a buyer through utilization of hyperlink 1340 of FIG. 13. Group offer 1400 includes the name of the seller, the date and/or time period of the offer, the group code and the price or discount curve. Group 1400 also includes a hyperlink 1410 that a buyer may utilize to make a purchase in accordance with the offer. In the example group offer 1400, the seller is offering a discount on the total purchase volume of any goods and/or service provided by that seller. In one instance, hyperlink 1410 may send the buyer directly to the seller. The buyer enters the group code displayed in the group offer 1400 when making a purchase in order for the buyer's purchase to be recorded by the purchase tracking component 240 (FIG. 2). Hyperlink 1410 may also redirect the buyer to an electronic forum or deal room on central server 910 (FIG. 9) wherein the buyer may complete the purchase.

Figure 15:
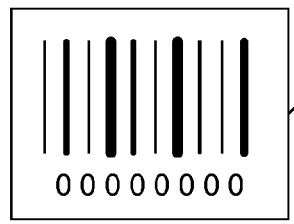
FIG. 15 illustrates a group buying offer including a bar code.

FIG. 15 depicts another exemplary group offer 1500 in accordance with an aspect of the subject disclosure. Group offer 1500 includes offer details similar to group offer 1400 in FIG. 14. Instead of an alphanumeric group code, group offer 1500 includes a graphical bar code 1510. A buyer may print bar code 1510 and utilize the bar code when making a purchase at a seller's location. Alternatively, a buyer may present the bar code for scanning via a mobile device (e.g., personal digital assistant (PDA), phone, music/video player . . . ) at a seller's location.

Figure 16:
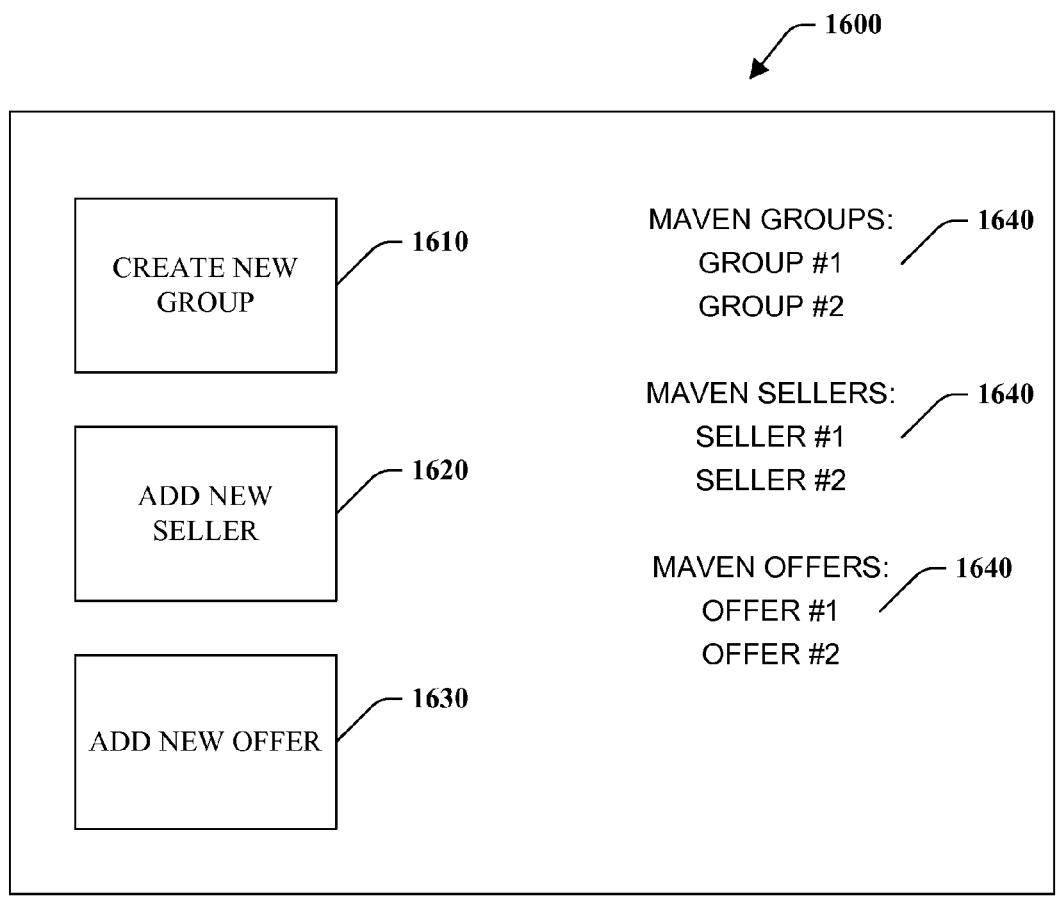
FIG. 16 is a web page for a host to create or modify buying groups.

Turning now to FIG. 16, an exemplary maven web page 1600 is illustrated. Web page 1600 displays a list of buying groups currently hosted by the maven, a list of sellers currently available to the maven, and a list of offers currently provided to the buying groups. The web page 1600 also includes various hyperlinks 1610, 1620, 1630 and 1640 to enable the maven to access various aspects of the system. Hyperlink 1610 enables the maven to create a new buying group. Hyperlink 1620 enables the maven to find new sellers to add to the list of available sellers. The maven employs hyperlink 1630 to add a new offer available to one or more hosted buying groups. The maven can review the details of a buying group, a seller, or an offer utilizing hyperlinks 1640.

Figure 17:
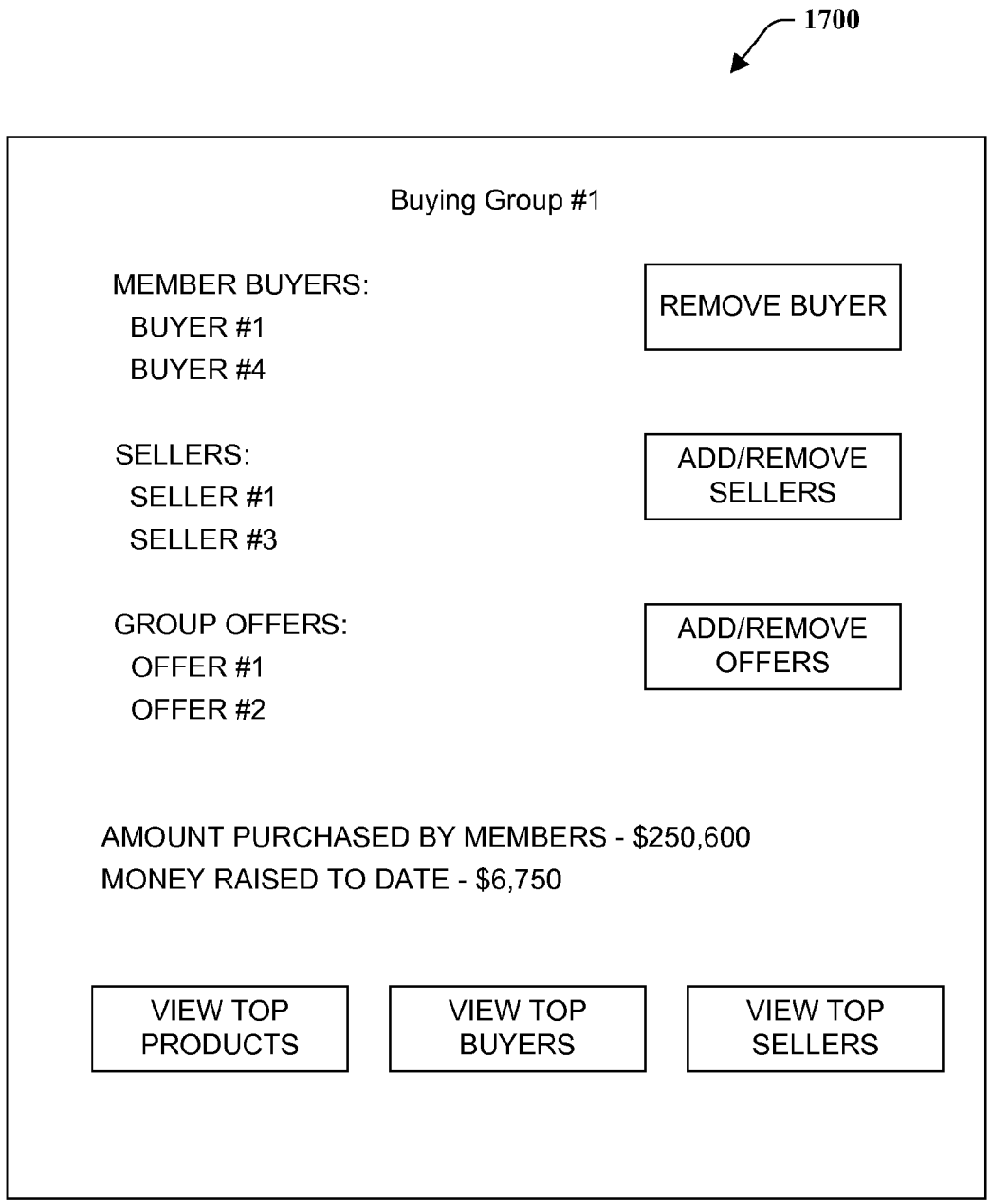
FIG. 17 is an input screen for managing a buying group.

Referring to FIG. 17, an exemplary maven input screen 1700 is depicted. The input screen 1700 displays the details of a particular buying group hosted by the maven. Input screen 1700 includes a list of buyer who are members of the group, a list of sellers providing specials to the buying group, and a list of offers currently available to the buying group. Input screen 1700 enables a maven to remove buyers from the buying group. The maven may also add and/or remove sellers and offers from the buying group by employing input screen 1700.

Input screen 1700 also displays the total amount purchased to date by members of the buying group. In addition, the total amount received in discounts under a price or discount curve is also displayed. The maven may utilize the input screen 1700 to view the best selling products, the top buyers making the most purchases or top sellers with the largest sales volume.

Figure 18:
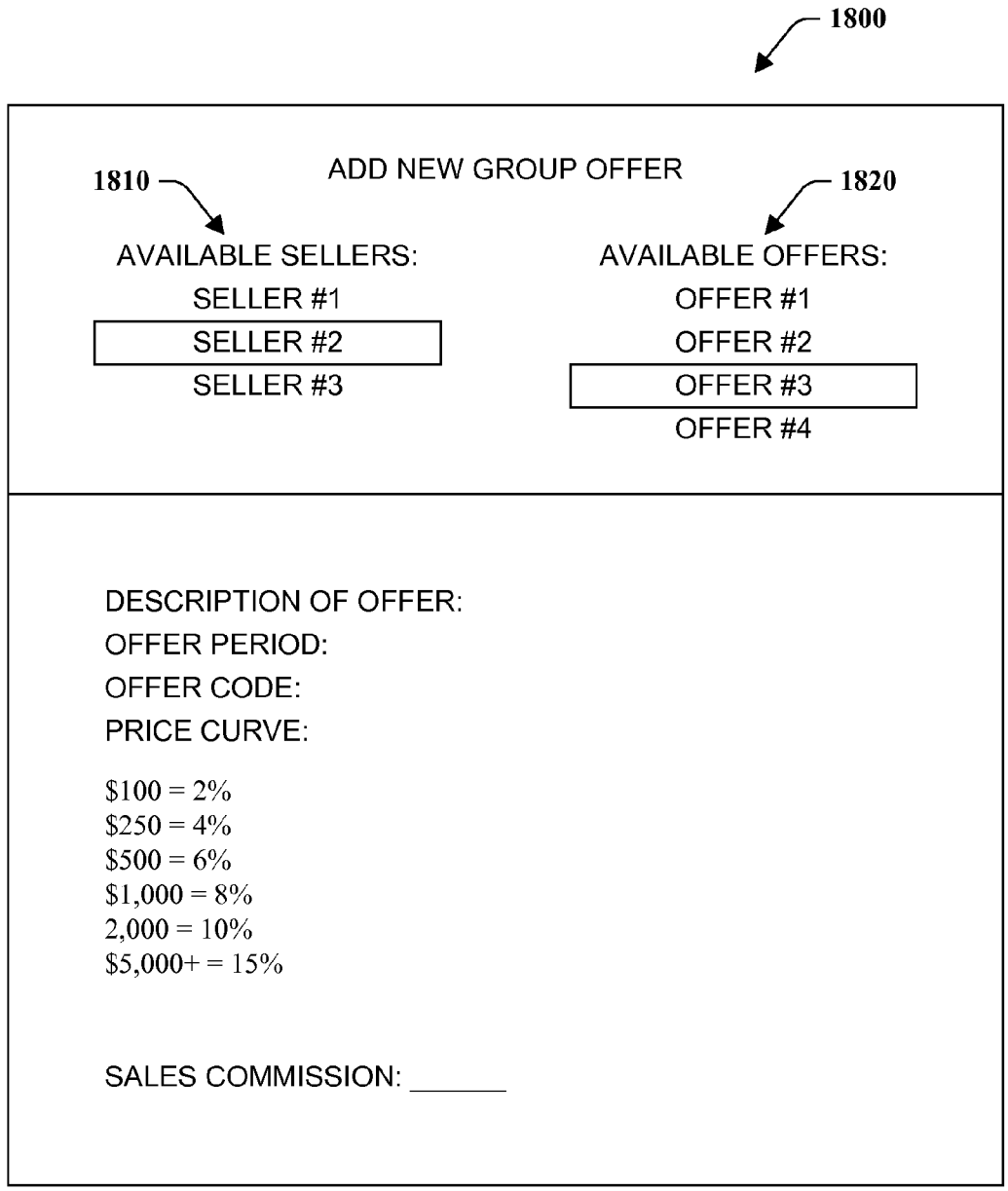
FIG. 18 is a host's new group offer input screen.

Turning now to FIG. 18, a maven input screen 1800 for adding a new offer to a buying group is illustrated. Input screen 1800 include of list of available sellers 1810. List 1810 includes all sellers that the maven may interact with and include in group-buying events. If the maven selects a seller from the list of sellers 1810, a list of offers 1820 from the seller is displayed. The maven selects an offer and can review the details of the offer. The details include a description of the offer, an offer period, an offer code and a price curve. Input screen 1800 enables the maven to enter a sales commission to be taken from the price curve before providing the offer to the buying group.

Figure 19:
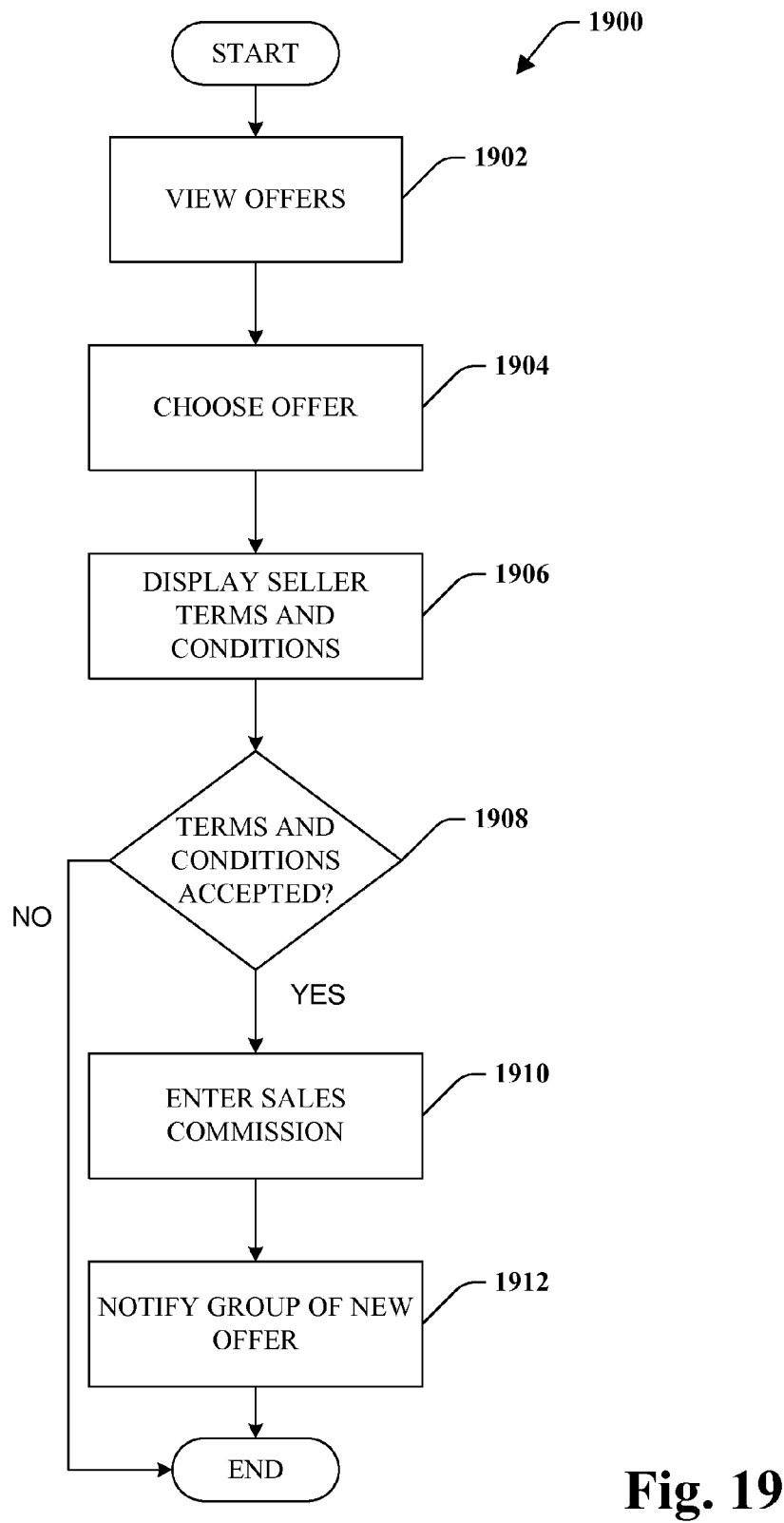
FIG. 19 is a flow chart diagram for a host adding a new group offer.

Referring now to FIG. 19, a method for adding a new offer 1900 is provided. At reference numeral 1902, offers are displayed for review. At 1904, a desirable offer is selected to be added to a buying group. At 1906, the terms and conditions established for the seller providing the selected offer are displayed for review. At numeral 1908, a determination is made as to whether the seller's terms and conditions are accepted. If no, method 1900 cycles back to numeral 1902 where the available offers are displayed for selection. If yes, method 1900 proceeds to 1910, where a sales commission amount is entered in accordance with the terms and conditions of the seller. If the terms and conditions of the seller disallow a sales commission, this option will not be presented. Further, if the terms and conditions dictate a sales commission amount, the specified commission will be entered at 1910. At 1912, the buying group is notified that a new offer is available. Each member of the buying group will be notified according to the preferred contact method supplied in registration form 1200 (FIG. 12). Additionally, the new offer will be available for displayed after buyer login, for example, at 1118 of FIG. 11.

Figure 20:
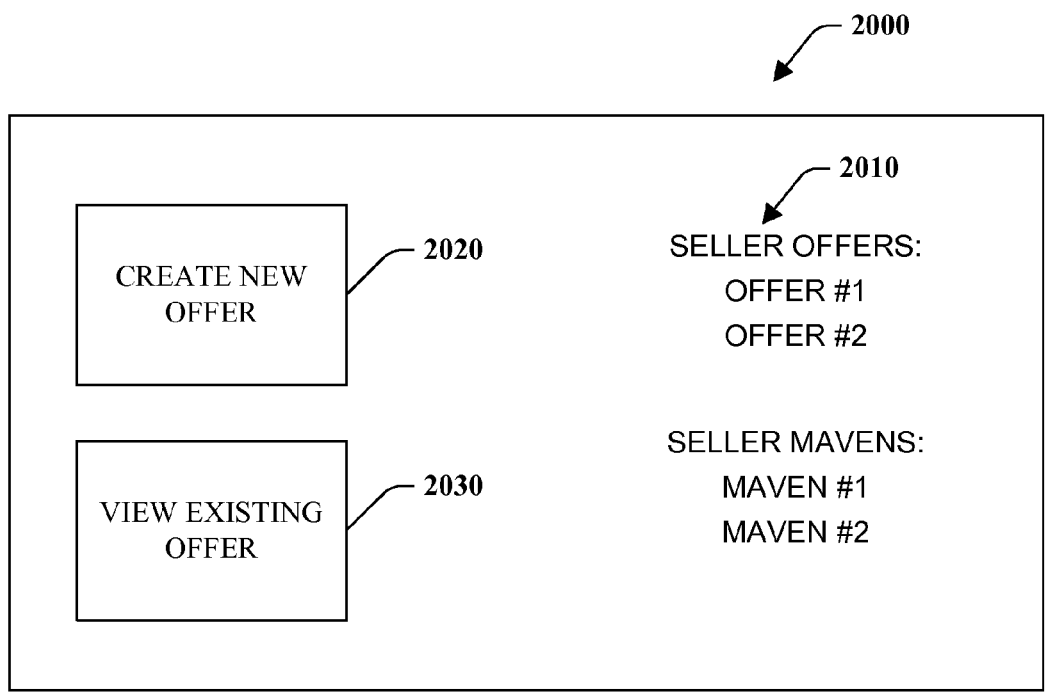
FIG. 20 is a seller input screen providing options to create or modify offers.

Referring now to FIG. 20, a seller input screen 2000 is illustrated. The seller input screen 2000 includes a list of offers 2010 currently provided by the seller. An option 2020 on the input screen 2000 is provided to enable the seller to create a new offer that can be made available to a buying group via a maven. The seller can also utilize an option 2030 to view details of an existing offer.

Turning now to FIG. 21, a seller input screen 2100 for establishing a new offer is provided. The seller inputs a description of the offer, a start date and time of the offer, an end date and time of the offer and a desired price or discount schedule. The seller may desire to provide the offer to only a select group of mavens. Accordingly, input screen 2100 includes an option to enter mavens to which the offer will be made available for inclusion in a buying group. For example, only those mavens listed by the seller on input screen 2100 will see the seller and offer in the list of sellers 1810 and list of offers 1820 on the maven input screen 1800 in FIG. 18. The seller may also specify a particular price incentive offered to mavens. The price incentive establishes the sales commission the maven receives on purchases by the buying group under the offer.

For purposes of brevity and clarity, discussion of additional aspects of deal rooms and demand aggregation (e.g., setup, interaction . . . ) has not been explicitly reproduced herein. For additional detail, regarding such subject matter see the additional patent applications incorporated herein by reference.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 22:
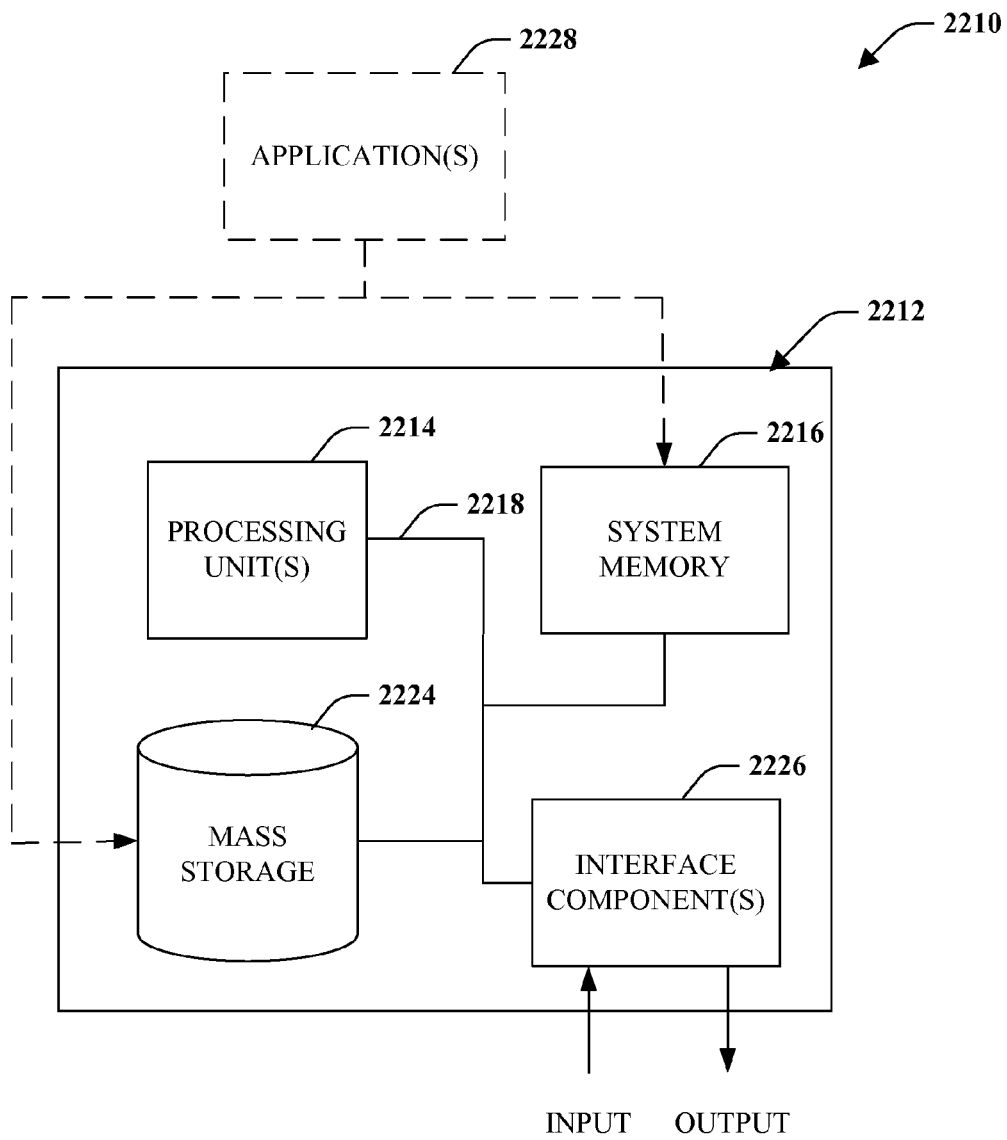
FIG. 22 is a schematic block diagram illustrating a suitable operating environment for aspects of the subject innovation.
Figure 23:
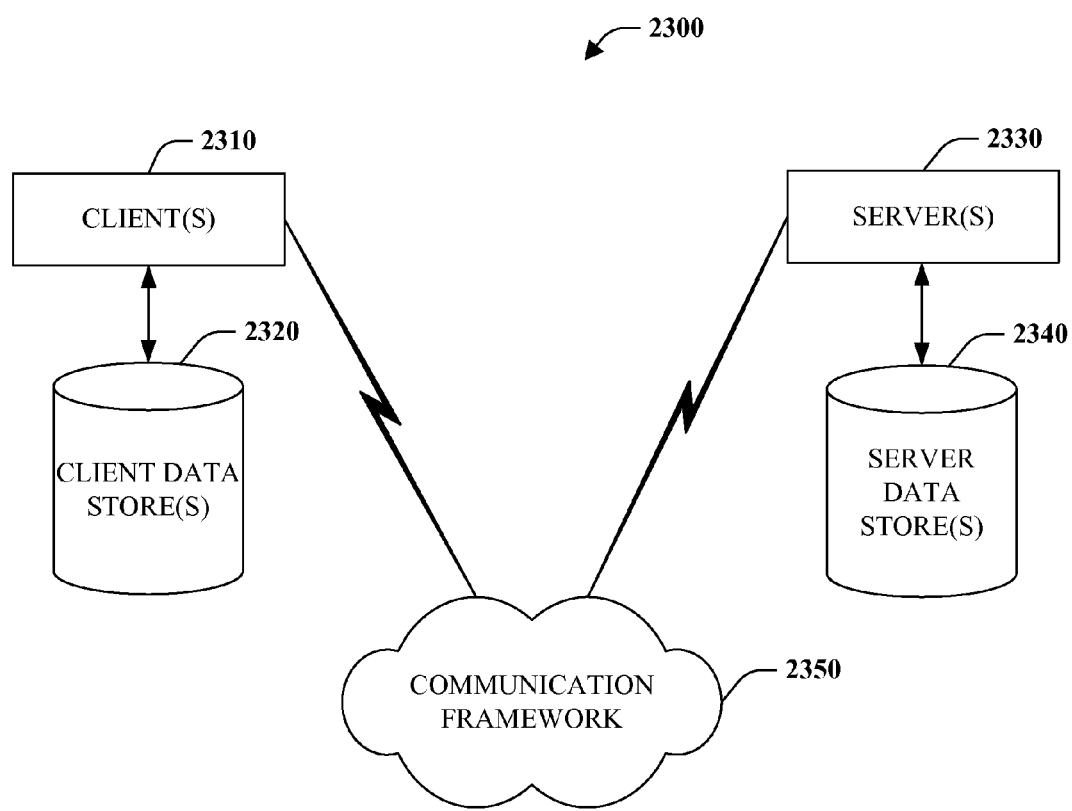
FIG. 23 is a schematic block diagram of a sample-computing environment.

In order to provide a context for the various aspects of the disclosed subject matter, FIGS. 22 and 23 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 22, an exemplary environment 2210 for implementing various aspects disclosed herein includes a computer 2212 (e.g., desktop, laptop, server, set-top box, hand held, programmable consumer or industrial electronics . . . ). The computer 2212 includes a processing unit 2214, a system memory 2216 and a system bus 2218. The system bus 2218 couples system components including, but not limited to, the system memory 2216 to the processing unit 2214. The processing unit 2214 can be any of various available microprocessors. It is to be appreciated that dual microprocessors, multi-core and other multiprocessor architectures can be employed as the processing unit 2214.

The system memory 2216 includes volatile and nonvolatile memory. The basic input/output system (BIOS), including the basic routines to transfer information between elements within the computer 2212, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 2212 also includes removable/non-removable, volatile/non-volatile computer storage media. FIG. 22 illustrates, for example, mass storage 2224. Mass storage 2224 includes, but is not limited to, devices like a magnetic or optical disk drive, floppy disk drive, flash memory or memory stick. In addition, mass storage 2224 can include storage media separately or in combination with other storage media.

FIG. 22 provides software application(s) 2228 that act as an intermediary between users and/or other computers and the basic computer resources described in suitable operating environment 2210. Such software application(s) 2228 include one or both of system and application software. System software can include an operating system, which can be stored on mass storage 2224, that acts to control and allocate resources of the computer system 2212. Application software takes advantage of the management of resources by system software through program modules and data stored on either or both of system memory 2216 and mass storage 2224.

The computer 2212 also includes one or more interface components 2226 that are communicatively coupled to the bus 2218 and facilitate interaction with the computer 2212. By way of example, the interface component 2226 can be a port (e.g., serial, parallel, PCMCIA, USB, FireWire . . . ) or an interface card (e.g., sound, video, network . . . ) or the like. The interface component 2226 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 2212 to output device(s) via interface component 2226. Output devices can include displays (e.g., CRT, LCD, plasma . . . ), speakers, printers and other computers, among other things.

FIG. 23 is a schematic block diagram of a sample-computing environment 2300 with which the subject innovation can interact. The system 2300 includes one or more client(s) 2310. The client(s) 2310 can be hardware and/or software (e.g., threads, processes, computing devices). The system 2300 also includes one or more server(s) 2330. Thus, system 2300 can correspond to a two-tier client server model or a multi-tier model (e.g., client, middle tier server, data server), amongst other models. The server(s) 2330 can also be hardware and/or software (e.g., threads, processes, computing devices). The servers 2330 can house threads to perform transformations by employing the aspects of the subject innovation, for example. One possible communication between a client 2310 and a server 2330 may be in the form of a data packet transmitted between two or more computer processes.

The system 2300 includes a communication framework 2350 that can be employed to facilitate communications between the client(s) 2310 and the server(s) 2330. Here, the client(s) can correspond to buyer and/or maven computing devices and the server(s) can provide the functionality with respect to maintaining deal rooms and demand aggregation, as previously described. The client(s) 2310 are operatively connected to one or more client data store(s) 2360 that can be employed to store information local to the client(s) 2310. Similarly, the server(s) 2330 are operatively connected to one or more server data store(s) 2340 that can be employed to store information local to the servers 2330. By way of example, a user (e.g., buyer, seller, maven . . . ) can login to one or more servers 2330 via a client 2310 to facilitate interaction with deal room/demand aggregation data persisted to data store(s) 2340.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A non-transitory computer readable storage medium having embodied thereon instructions executable by a processor to:
   maintain buyer profiles in a non-transitory computer readable storage medium;
   derive customized pricing arrangements for a product based on information corresponding to a buyer profile, and varying in accordance with a quantity of the product ordered from a plurality of forums for aiding in the aggregate buying and/or selling of goods;
   offer the product for acquisition in at least one of the plurality of forums, the product offered in each forum in accordance with at least one of the customized pricing arrangements; and
   display at least one of the plurality of forums in which the product is offered when a set of searched requirements match at least part of a description about the product.

2. The non-transitory computer readable storage medium of claim 1, further comprising instructions executable by a processor to provide an incentive that modifies at least one of the customized pricing arrangements for at least one buyer.

3. The non-transitory computer readable storage medium of claim 2, wherein the incentive is determined by analyzing buyer activity.

4. The non-transitory computer readable storage medium of claim 3, wherein the incentive is a lower price for the product when a certain activity has been determined to have taken place.

5. The non-transitory computer readable storage medium of claim 1, wherein the buyer profile includes information obtained from a surveyor questionnaire.

6. The non-transitory computer readable storage medium of claim 5, wherein the information in the surveyor questionnaire is collected by a third party.

7. The non-transitory computer readable storage medium of claim 1, wherein the offer for acquisition is limited to an open session period corresponding to a time during which orders to purchase the product are accepted.

8. A non-transitory computer readable storage medium having embodied thereon instructions executable by a processor to:
   maintain buyer profiles in a non-transitory computer readable storage medium;
   derive pricing arrangements that require a minimum quantity of a product ordered by a plurality of buyers within a finite period of time in order for every buyer to receive a discount, wherein each of the pricing arrangements is based on information corresponding to a buyer, and the buyer may receive a price that is lower than an otherwise published price based on information contained within the buyer profile;
   offer the product for acquisition in at least one of a plurality of forums, the product offered in each forum in accordance with at least one of the price arrangements; and
   display a listing of at least one of the plurality of forums in which the product is offered when a set of search requirements match at least part of a description about the product.

9. The non-transitory computer readable storage medium of claim 8, wherein the buyer profile is created in part from a surveyor questionnaire.

10. The non-transitory computer readable storage medium of claim 8, wherein the buyer profile is created in part from information collected by a third party.

11. A non-transitory computer readable storage medium having embodied thereon instructions executable by a processor to:
    maintain buyer profiles in a non-transitory computer readable storage medium;
    derive pricing arrangements for an item that are based on a minimum quantity of an item ordered by a plurality of buyers within a period of time for every buyer to receive a discount, wherein each of the pricing arrangements is based on information corresponding to a buyer, and a buyer may receive a price that is lower than an otherwise published price based on information contained within the buyer profile and a minimum quantity of a different item ordered within a period of time;
    offer the item for acquisition in at least one of the plurality of forums, the item offered in each forum in accordance with at least one of the pricing arrangements; and
    display at least one of the plurality of forums in which the item is offered when a search for an element describing the item is provided.

12. The non-transitory computer readable storage medium of claim 11, wherein the buyer profile includes information concerning products ordered and the time of each order.

13. The non-transitory computer readable storage medium of claim 11, further comprising instructions executable to present a buyer with a personalized offer, wherein at least one element of the personalized offer is based on information contained within the buyer profile.

14. The non-transitory computer readable storage medium of claim 11, further comprising segmenting buyers into different groups based in part on past orders.

15. The non-transitory computer readable storage medium of claim 11, wherein
    the buyer profile is created in part from a surveyor questionnaire.

16. The non-transitory computer readable storage medium of claim 11, further comprising segmenting buyers into different groups based on past orders.

* * * * *

UNITED STATES PATENT AND TRADEMARK OFFICE
CERTIFICATE OF CORRECTION

PATENT NO. : 8,160,931 B2
APPLICATION NO. : 13/272147
DATED : April 17, 2012
INVENTOR(S) : Mesaros It is certified that error appears in the above-identified patent and that said Letters Patent is hereby corrected as shown below:

Col. 19, line 50 should read:
Claim 5. The non-transitory computer readable storage medium of claim 1, wherein the buyer profile includes information obtained from a survey or questionnaire.

Col. 19, line 52 should read:
Claim 6. The non-transitory computer readable storage medium of claim 5, wherein the information in the survey or questionnaire is collected by a third party.

Col. 20, line 18 should read:
Claim 9. The non-transitory computer readable storage medium of claim 8, wherein the buyer profile is created in part from a survey or questionnaire.

Col. 20, line 55 should read:
Claim 15. The non-transitory computer readable storage medium of claim 11, wherein the buyer profile is created in part from a survey or questionnaire.

Signed and Sealed this
Twenty-second Day of May, 2012

David J. Kappos
*Director of the United States Patent and Trademark Office*